US006304967B1

(12) United States Patent
Braddy

(10) Patent No.: US 6,304,967 B1
(45) Date of Patent: Oct. 16, 2001

(54) SYSTEM AND ARCHITECTURE FOR DISTRIBUTING, MONITORING, AND MANAGING INFORMATION REQUESTS ON A COMPUTER NETWORK

(75) Inventor: Ricky Gene Braddy, Houston, TX (US)

(73) Assignee: RMC Software, Inc., Houston, TX (US)

( * ) Notice: Subject to any disclaimer, the term of this patent is extended or adjusted under 35 U.S.C. 154(b) by 0 days.

(21) Appl. No.: 09/596,631

(22) Filed: Jun. 19, 2000

Related U.S. Application Data

(63) Continuation of application No. 08/988,107, filed on Dec. 10, 1997.

(51) Int. Cl.[7] .......... G06F 01/24
(52) U.S. Cl. .......... 713/150; 713/168
(58) Field of Search .......... 713/150, 168, 713/171, 182

(56) References Cited

U.S. PATENT DOCUMENTS

| | | | |
|---|---|---|---|
| 5,341,477 | 8/1994 | Pitkin et al. | 395/200 |
| 5,371,852 | 12/1994 | Attanasio et al. | 395/200 |
| 5,452,459 | 9/1995 | Drury et al. | 395/700 |
| 5,459,837 | 10/1995 | Caccavale | 395/184.01 |
| 5,475,819 | 12/1995 | Miller et al. | 395/200.03 |
| 5,490,252 | 2/1996 | Macera et al. | 395/200.01 |
| 5,522,042 | 5/1996 | Fee et al. | 395/200.1 |
| 5,522,070 | 5/1996 | Sumimoto | 395/650 |
| 5,548,724 | 8/1996 | Akizawa et al. | 395/200.3 |
| 5,553,239 | 9/1996 | Heath et al. | 395/187.01 |
| 5,574,903 | 11/1996 | Szymanski et al. | 395/601 |
| 5,581,552 | 12/1996 | Civanlar et al. | 370/396 |
| 5,606,493 | 2/1997 | Duscher et al. | 364/134 |
| 5,617,570 | 4/1997 | Russell et al. | 395/684 |
| 5,623,601 | 4/1997 | Vu | 395/187.01 |
| 5,774,660 | 6/1998 | Brendel et al. | 395/200.31 |
| 5,857,102 | 1/1999 | McChesney et al. | 395/653 |
| 5,909,542 | 6/1999 | Paquette et al. | 395/200.33 |
| 6,058,424 * | 5/2000 | Dixon et al. | 709/226 |

* cited by examiner

*Primary Examiner*—Thomas R. Peeso
(74) *Attorney, Agent, or Firm*—Jenkens & Gilchrist, P.C.

(57) ABSTRACT

A system and method are disclosed for distributing, monitoring and managing information requests on a computer network including one or more client computer systems, a first server computer system, and one or more secondary server computer systems. Information requests from the client computer systems to the first server computer system are intercepted and examined by a request broker software system implemented on the first server computer system. The request broker software system examines information regarding the capabilities and resources available on the first server computer system and the secondary server computer systems to determine whether to process the information request locally on the first server computer system or to process the information request remotely on one of the secondary server computer systems. The request broker software system will off-load or distribute the information requests to the secondary server computer systems so as to load-balance the information requests among the secondary server computer systems. The request broker software system will also monitor the processing of information requests and initiate recovery actions in the event a fault or error occurs during the processing of the request. If the information request is to be processed remotely on one of the secondary server computer systems, the request broker software system establishes an authenticated communication channel with the selected secondary server computer system to transmit the information request to the selected server computer system. The secondary server computer system processes the information request and sends the results back to the request broker software system on the first server computer system. The request broker software then sends the results of the information request that was processed either locally or remotely back to the client computer system that originated the information request.

21 Claims, 31 Drawing Sheets

```
;;;;;;;;;;;;;;;;;;;;;;;;;;;;;;;;;;;;;;;;;;;;;;;;;;;;;;;;;;;;;;;;;;;;
;
; broker1.cfg    ---    Configuration File for Broker
;
;;;;;;;;;;;;;;;;;;;;;;;;;;;;;;;;;;;;;;;;;;;;;;;;;;;;;;;;;;;;;;;;;;;;
; Broker Configuration Settings
;;;;;;;;;;;;;;;;;;;;;;;;;;;;;;;;;;;;;;;;;;;;;;;;;;;;;;;;;;;;;;;;;;;;
[Broker]
; Set AdapterEnabled to true if HTTP adapter (Broker) in-use
AdapterEnabled=true
; NetworkTransport is: TCP
NetworkTransport=TCP
; MaxConnections is the max. number of sockets opened by Broker
MaxConnections=100
; set "LocalFallback" to true if local pool will be used when network fails
LocalFallback=false
; set "UseLocalPool" to true if local pool will be used in conjunction w/ network pool
UseLocalPool=false
; set "ServerUrlRefreshTime" to configure how often to refresh the cgi server URL list's (in
minutes)
ServerUrlRefreshTime=10
```

79

```
;;;;;;;;;;;;;;;;;;;;;;;;;;;;;;;;;;;;;;;;;;;;;;;;;;;;;;;;;;;;;;;;;;;;
; Server Configuration Settings
;;;;;;;;;;;;;;;;;;;;;;;;;;;;;;;;;;;;;;;;;;;;;;;;;;;;;;;;;;;;;;;;;;;;
[Servers]
; "MaxContentServers" controls the max. content server threads/processes allocated
MaxContentServers=50
; Set NetworkContentServers to 0 for local operation, non-zero for network CGI-Server count
NetworkServers=2
; Each [ServerX] section defines a networked content server
[Server1]
ServerEnabled=true
Description=CGI-Server on hostA
Host=hostA
ServerPort=8001
AdminPort=8999
ExtraNetTimeoutSeconds=0    ; extra net delay if this server is on a remote link
Auth=authentication-password
[Server2]
ServerEnabled=true
Description=CGI-Server on hostB
Host=hostB
ServerPort=8002
AdminPort=8999
```

80 { ExtraNetTimeoutSeconds=0    ; extra net delay if this server is on a remote link
     Auth=authentication-password

```
;;;;;;;;;;;;;;;;;;;;;;;;;;;;;;;;;;;;;;;;;;;;;;;;;;;;;;;;;;;;;;;;;;
; Fault Handling
;;;;;;;;;;;;;;;;;;;;;;;;;;;;;;;;;;;;;;;;;;;;;;;;;;;;;;;;;;;;;;;;;;
[CGI]
VisibleShell=false
MinFreeKB=1024              ; minimum KB RAM for additional CGI scheduling
BaseNetTimeoutSeconds=30    ; base network timeout (be careful if too low!)
BaseCgiTimeoutSeconds=30    ; base request max processing time
CommFailRetryRate=100       ; # of requests per comm. failed server retry
RequestRetries=3            ; # of retries for failed CGI request
```
(81)

```
;;;;;;;;;;;;;;;;;;;;;;;;;;;;;;;;;;;;;;;;;;;;;;;;;;;;;;;;;;;;;;;;;;
; File Type (Extension Mappings) are used to map file extensions to execution path
;
;       Following is a list of valid variables:
;       %v - virtual path (e.g /cgi-bin/
;       %r - root path (e.g. /bmc/ww/wwi/bin/mycgi)
;       %m - mapped path (e.g. /bmc/ww/wwi/bin)
;       %e - file extension (e.g. .pl)
;       %b - base file name (e.g. cgi-send)
;       %x - platform extension (e.g. ".exe" on NT, "" on UNIX)
;       %q - QUERY_STRING (NOTE: QUERY_STRING always appended as last args)
;       %% - use '%' (e.g. %)
;
;;;;;;;;;;;;;;;;;;;;;;;;;;;;;;;;;;;;;;;;;;;;;;;;;;;;;;;;;;;;;;;;;;
[FileExtensions]
NumberOfExtensions=11
[FileExtension1]
Extension=<none>
Platform=<all>
FormatString=%r%e
[FileExtension2]
Extension=.exe
Platform=<all>
FormatString=%r%e
[FileExtension3]
Extension=.pl
Platform=NT
FormatString=perl.exe %r%e
[FileExtension4]
Extension=.pl
Platform=UNIX
```
(82)

*FIG. 5b*

```
            FormatString = %r%e
            [FileExtension5]
            Extension = .cgi
            Platform = <all>
            FormatString = %r%e
            [FileExtension6]
            Extension = .tcl
            Platform = UNIX
            FormatString = tclsh %r%e
            [FileExtension7]
            Extension = .bat
            Platform = NT
            FormatString = %r%e
            [FileExtension8]
  82 {       Extension = .csh
            Platform = UNIX
            FormatString = /bin/csh %r%e
            [FileExtension9]
            Extension = .sh
            Platform = UNIX
            FormatString = /bin/sh %r%e
            [FileExtension10]
            Extension = .ksh
            Platform = UNIX
            FormatString = /bin/ksh %r%e
            [FileExtension11]
            Extension = .cfm
            Platform = NT
            FormatString = cfml.exe %r%e

            ;;;;;;;;;;;;;;;;;;;;;;;;;;;;;;;;;;;;;;;;;;;;;;;;;;;;;;;;;;;;;;;;
            ; Directory Mappings = mappings are used to map Virtual Paths to F.M., Physical Path, & More
            ;;;;;;;;;;;;;;;;;;;;;;;;;;;;;;;;;;;;;;;;;;;;;;;;;;;;;;;;;;;;;;;;
            [Mappings]
            NumberOfMappings = 3
            [Mapping1]
            FilterModuleId = CGI
  83 {       RequestMode = 1
            VirtualPath = /cga-internal/
            MappedPath = /bmc/ww/wwi/bin
            ExtraCgiTimeoutSeconds = 0   ; extra time to process these requests
            Tracing = 0
            [Mapping2]
            FilterModuleId = CGI
            RequestMode = 3
```

```
VirtualPath=/cgi-bin/
MappedPath=/bmc/ww/wwi/webload-bin
ExtraCgiTimeoutSeconds=0   ; extra time to process these requests
Tracing=0
[Mapping3]
FilterModuleId=CGI
RequestMode=3
VirtualPath=/webload-bin/
MappedPath=/bmc/ww/wwi/webload-bin
ExtraCgiTimeoutSeconds=0   ; extra time to process these requests
Tracing=0
```

FIG. 5d

```
;;;;;;;;;;;;;;;;;;;;;;;;;;;;;;;;;;;;;;;;;;;;;;;;;;;;;;;;;;;;;;;;;;;;
;
;  server1.cfg     ---    Configuration File for Server
;
;;;;;;;;;;;;;;;;;;;;;;;;;;;;;;;;;;;;;;;;;;;;;;;;;;;;;;;;;;;;;;;;;;;;
; Server Configuration Settings
;;;;;;;;;;;;;;;;;;;;;;;;;;;;;;;;;;;;;;;;;;;;;;;;;;;;;;;;;;;;;;;;;;;;
[Servers]
; "MaxContentServers" controls the max. content server threads/processes allocated
MaxContentServers=50
; Set "ListenQueue" to the desired server listen queue depth
ListenQueue=128
; Set "ListenPort" to the desired server listen port number
ListenPort=8001
; Set "ServerModel" to either "THREAD" or "PROCESS"
ServerModel=THREAD
; MaxThreads (thread model only) controls maximum number of comm. threads
MaxThreads=1024
; Authenticator used for security
Auth=authentication-password
; Default CGI Root
DefaultCgiRoot=c:/bmc/ww/wwi/customer
; Set NetworkContentServers to 0 for local operation, non-zero for network CGI-Server count
NetworkServers=0     ;; zero for local operation (typical for CGI-Servers)
; Pending state (used for admin only)
PendingState=ON

; Internal Housekeeping Settings (not user-tunable)
ListenLoopSecs=5        ; main listener housekeeping loop rate
ChildLoopSecs=5         ; child thread/process housekeeping loop rate
ChildIdleExitSecs=60    ; time idle until child thread/process exits
```

84

```
;;;;;;;;;;;;;;;;;;;;;;;;;;;;;;;;;;;;;;;;;;;;;;;;;;;;;;;;;;;;;;;;;;;;
; Fault Handling
;;;;;;;;;;;;;;;;;;;;;;;;;;;;;;;;;;;;;;;;;;;;;;;;;;;;;;;;;;;;;;;;;;;;
[CGI]
VisibleShell=false
MinFreeKB=1024          ; minimum KB RAM for additional CGI scheduling
```

85

```
;;;;;;;;;;;;;;;;;;;;;;;;;;;;;;;;;;;;;;;;;;;;;;;;;;;;;;;;;;;;;;;;;;;;
; File Type Extension Mappings are used to map file extensions to execution path
;
;      Following is a list of valid variables:
;      %v - virtual path (e.g /cgi-bin/
;      %r - root path (e.g. /bmc/ww/wwi/bin/mycgi)
```

```
;       %m - mapped path (e.g. /bmc/ww/wwi/bin)
;       %e - file extension (e.g. .pl)
;       %b - base file name (e.g. cgi-send)
;       %x - platform extension (e.g. ".exe" on NT, "" on UNIX)
;       %q - QUERY_STRING (NOTE: QUERY_STRING always appended as last args)
;       %% - use '%' (e.g. %)
;
;;;;;;;;;;;;;;;;;;;;;;;;;;;;;;;;;;;;;;;;;;;;;;;;;;;;;;;;;;;;;;;;;;;;;;;;;;;;
[FileExtensions]
NumberOfExtensions=11
[FileExtension1]
Extension=<none>
Platform=<all>
FormatString=%r%e
[FileExtension2]
Extension=.exe
Platform=<all>
FormatString=%r%e
[FileExtension3]
Extension=.pl
Platform=NT
FormatString=perl.exe %r%e
[FileExtension4]
Extension=.pl
Platform=UNIX
FormatString=%r%e
[FileExtension5]
Extension=.cgi
Platform=<all>
FormatString=%r%e
[FileExtension6]
Extension=.tcl
Platform=UNIX
FormatString=tclsh %r%e
[FileExtension7]
Extension=.bat
Platform=NT
FormatString=%r%e
[FileExtension8]
Extension=.csh
Platform=UNIX
FormatString=/bin/csh %r%e
[FileExtension9]
Extension=.sh
Platform=UNIX
```

```
FormatString=/bin/sh %r%e
[FileExtension10]
Extension=.ksh
Platform=UNIX
FormatString=/bin/ksh %r%e
[FileExtension11]
Extension=.cfm
Platform=NT
FormatString=cfml.exe %r%e
```

87

```
;;;;;;;;;;;;;;;;;;;;;;;;;;;;;;;;;;;;;;;;;;;;;;;;;;;;;;;;;;;;;;;;;;;;;;;;;;;;;;
; Directory Mappings = mappings are used to map Virtual Paths to F.M., Physical Path, & More
;;;;;;;;;;;;;;;;;;;;;;;;;;;;;;;;;;;;;;;;;;;;;;;;;;;;;;;;;;;;;;;;;;;;;;;;;;;;;;
[Mappings]
NumberOfMappings=3
[Mapping1]
FilterModuleId=CGI
RequestMode=1
VirtualPath=/cga-internal/
MappedPath=/bmc/ww/wwi/bin
ExtraCgiTimeoutSeconds=0   ; extra time to process these requests
Tracing=0
[Mapping2]
FilterModuleId=CGI
RequestMode=3
VirtualPath=/cgi-bin/
MappedPath=/bmc/ww/wwi/webload-bin
ExtraCgiTimeoutSeconds=0   ; extra time to process these requests
Tracing=0
[Mapping3]
FilterModuleId=CGI
RequestMode=3
VirtualPath=/webload-bin/
MappedPath=/bmc/ww/wwi/webload-bin
ExtraCgiTimeoutSeconds=0   ; extra time to process these requests
Tracing=0
```

*FIG. 6c*

BROKER MANAGER (cont'd)

CONTENT SERVER MANAGER (cont'd)

CONTENT SERVER MANAGER (cont'd)

CONTENT SERVER MANAGER (cont'd)

NETWORK SERVER MANAGER

DISPATCHER(cont'd)

SYSTEM AND ARCHITECTURE FOR DISTRIBUTING, MONITORING, AND MANAGING INFORMATION REQUESTS ON A COMPUTER NETWORK

This application is a continuation of application Ser. No. 08/988,107, filed on Dec. 10, 1997.

TECHNICAL FIELD OF THE INVENTION

This invention relates to generally to computer networks. More specifically, to a system and architecture for distributing, monitoring, and managing information requests across a distributed computing environment.

BACKGROUND OF THE INVENTION

Distributed computing environments, or computer networks, are designed to give computer system users the ability to send and receive information to other computer system users, and to obtain access to data sources and program applications on the computer network.

The utilization of computer networks has increased exponentially over the past decade such that current computer system architectures and technologies are unable to handle the increase. Not surprisingly, as the utilization of computer networks increases, the need for more reliable and more efficient computer network management also increases.

A computer network consists of two or more computer systems that are connected together so that they can transfer information between the computer systems. The computer systems on a computer network may be inter-connected to communicate with each other using a local or wide area network utilizing a variety of network communication techniques. The details and operation of such networks and communication technologies are well known to those skilled in the art.

There are two main types of computer networks, namely "intranets" and "intemets." An intranet is a private computer network, such as for a company or organization, that allows information to be transferred between the computer systems connected to the private network. The data sources and program applications of the intranet are generally not available to computer systems outside of the private network. In contrast, an "internet" is a computer network in which information is transferred between computer systems connected to different computer networks. A capitalized use of the term intemet, or "Internet," refers to the world-wide collection of inter-connected computer networks that use the TCP/IP communication protocols to transfer information. The term TCP/IP means "Transmission Control Protocol/Internet Protocol," and refers to a defined set of protocols for communication between computer systems and computer networks.

Client-Server Systems

Most computer networks are designed around the "client-server" methodology. FIG. 1 illustrates a basic client-server computer network configuration. In FIG. 1, a "client" computer system 10 is connected to a conmunication network 12 and may communicate with a "servers" computer system 14 on network 12. Server computer system 14 acts as a central computer system allowing access to local data sources 16–22, such as databases or applications, residing on server computer system 14 or across network 12. The term "local data source" refers generally to any data source or program application residing on server computer system 14 or any remote data source or program application across network 12 that is accessible to server computer system 14 using any available interface.

As shown in FIG. 1, server computer system 14 may handle information requests from a multiple of client computer systems 10, 24, 26, 28 connected to network 12. Server computer system 14 is generally referred to a "server" because it services the information requests of the "client" computer systems. In addition, program applications executing on server computer system 14 may also act as "clients" to other network server computer systems (not shown) implementing database applications or other legacy systems creating a multi-tier client-server network configuration. The term "information request" refers generally to any information request or program application request that may be processed by a server computer system. In addition, the term "resource" refers generally to both hardware and software components of a computer system or computer network that are used to perform the functions of the computer system or network. Such resources include, but are not limited to data files, databases, program applications, memory space, CPU time, communication ports, or legacy systems or other computer systems accessible across a network.

Hardware Configuration

The hardware present in each of the computer systems shown in FIG. 1 may be of any conventional type such as is typically found on computers in a client-server network environment. As shown in FIG. 2, it is anticipated, however, that server computer system 14 will be equipped with some sort of central processing unit (CPU) 30, some sort of conventional input/output equipment 32, such as a keyboard and a video display monitor, some sort of conventional data storage device 34, such as a disk or tape drive or CD ROM drive, some sort of random access memory (RAM) 36, and some sort of conventional network communication hardware 38, such as an ETHERNET interface unit for physically coupling the computer system to network 12. Network 12 may be implemented using any conventional network protocol such as TCP/IP, SNA, SMB, HTTP, FTP, IIOP, or DCOM.

In server computer system 14, a server software program 40 is stored on storage device 34 and installed on the server computer system 14. The server software program 40 is responsible for handling connections and information requests from the client computer system 10. The server software 40 may provide access to a variety of local data sources 16, 18, 20, 22 present on server computer system 14. For example, the server software 40 may allow access to information databases, such as DB2, IMS, Oracle, and Sybase. Additionally, server software 40 may allow access to other network server computer systems running client-server or legacy systems.

A computer network may contain more one or more server computer systems to allow access to a variety of data sources and program applications on the network. Additionally, the term "server" may refer to a particular software program running on a computer system, in that a single server computer system could have several different server software programs installed and running on it at the same time, thus giving clients on the network access to different server programs and information resources.

The Internet

As stated above, the Internet is a world-wide collection of inter-connected computer networks that all support the TCP/

IP communication protocol. The term "World Wide Web" (WWW) generally refers to the collection of computer resources on the Internet that can be accessed using a variety of information protocols, such as HTTP, FTP, Gopher, telnet, USENET, WAIS, and others. HyperText Transport Protocol, or "HTTP," is the most widely used protocol on the Internet or WWW today. As a result, the term "the Web" is often used to refer to server computer systems on the Internet that support the HTTP information protocol.

FIG. 3 is a basic network diagram illustrating the Internet or WWW In FIG. 3, one or more client computer systems 42,44,46,48 running "web browser" programs 62 are connected to the Internet and communicate with server computer system 52 running a "web server" program 64. A "web browser" 62 is a software program installed and running on a client computer system that enables the client computer system to communicate with server computer systems to access the local data sources 54 residing on server computer system 52.

Information Protocols

Two common web browser software programs on the market today are Microsoft Corporation's "Internet Explorer" and Netscape Communications Corporation's "Navigator." A "web server" program is a software program installed and running on server computer system 52 that supports the HTTP information protocol. For example, Microsoft and Netscape produce web server programs to run on server computer systems interfacing with web browsers. A server computer system that is connected to the Internet 50 and is running a web server software program is generally referred to as a "web serve" system or "HTTP daemon." The HTTP information protocol defines how the web browser client computer systems 42–48 (or "web browsers") send requests to the web server computer system 52 (or "web server") and how the web server program 64 replies to the requests. The details of the communication protocols and the operation of the Internet 50 or WWW are well known to those skilled in the art. Similar to the computer network of FIG. 1, the web server 52 may allow web browser clients 42–48 access to data sources or applications present on web server 52 or to data sources or applications across the network 50.

URL—Uniform Resource Locator

Different types or formats of information may be communicated on the Internet 50. For example, an HTTP request sent by web browser 42 win identify a resource present on the web server 52 that the web browser 42 would like to access. The resource is identified by a "Uniform Resource Locator" or URL. The URL tells the web server what the resource is and where to find it. The details of URL's are well known to those skilled in the art. For the context of URL's, "resource" refers generally to a file or a file directory on a computer system.

If the URL of an HTTP request points to an HTL file (like "index.html") on the web server 52, then the contents of the HTML file are returned to the web browser 42. HTML irefers to "HyperText Markup Language" data format. HTML is a coding language used to create Hypertext documents that may be viewed by web browser 42 which has the capability of interpreting HTEL. HTML documents are primarily text files that don't change when viewed by the browser.

CGI—Common Gateway Interface

In contrast, if the URL points to a program or process (like "formmail.cgi"), then the web server 52 executes the program or process and returns the resulting output to the web browser 42. For example, if the URL points to a CGI program, the program is executed on web server 52, and the results are sent back to web browser 42. CGI or "Conmmon Gateway Interface" refers to a World Wide Web Consortium (W3C) standard for interfacing external computer applications with information servers, such as HTTP or web servers 52. A plain HTML document that the web server retrieves is static, which means that it exists in a constant state (e.g., a text file that does not change). A CGI program (or application) is executed in real-time, so that it can output dynamic information. CGI applications may include programs created to query information from a database or accept data input. A simple example is a stock quoting program that uses CGI applications to query a database for a specific stock price.

CGI is a standard that is fully supported by the World Wide Web Consortium (W3C). The CGI standard is well known to those skilled in the art. Other types of information standards supported on the Internet include Java, JavaScript, ActiveX, Active Server Pages (ASP), IIOP, Fast CGI, WinCGI, web server API's (such as NSAPI and ISAPI), OLE, Corba, RDBMS Native SQL, and ASCII files, to name a few. In almost all instances, all web servers support CGI programs or applications. In fact, approximately ninety percent of all applications developed for the Internet today are developed to use CGI.

Problem—Depletion of Computing Ability

As computer users advance simply from using Web technology as a convenient means of publishing and sharing information to interactive applications, basic web server technology is quickly outgrown. As the number of concurrent web browser users supported by a web server increases, the loading on the web server also increases as the web server attempts to service and respond to the web browser requests. This increased loading on the web server computer system will eventually deplete the computing resources of the server computer system, such as available memory and CPU processing time. Excessive and increased loading of the web server computer system will increase the time it takes for a web server to process or otherwise respond to requests received from web browser clients. This results in lower availability of the data sources or program applications on the web server computer system that the web browsers are attempting to access. Moreover, the response time for a web browser request may be increased to such an extent that a response is precluded altogether, making the web server computer system inaccessible, leading to "server unavailable" error messages.

Web server loading is especially a problem for CGI applications. Each CGI request from a web browser starts a new and separate process or thread on the web server computer system, thereby using limited computer resources to process each request. For example, when one hundred web browsers are accessing CGI applications at the same time, one hundred separate processes or threads are running concurrently on web server computer system. As the number of concurrent CGI request processes increases, the web server computer system resources available to process the requests declines dramatically. For example, a typical CGI request process start-up uses between 500 kilobytes and 1 megabyte of available system memory. Further, under Windows NT, each CGI request creates a new DOS box shell for each request, again using critical system resources. As a result, the performance of a web server computer system may be severely degraded by attempting to process too many concurrent information requests.

A partial solution for web server loading problems is to off-load and distribute information requests to other server computer systems to process the requests. However, this can only create other problems is the requests are not distributed to the secondary server computer systems in a manner such that the processing load is balanced for all of the server computer systems.

Problem—Network Firewalls

Another problem with current web technology deals with computer network firewalls. A network firewall is a server computer system or software program designed to act as a protective shield, or "firewall," between a computer system or computer network and external computer systems or networks. Firewalls are designed to block unauthorized and unwanted access to a computer network. Firewalls are typically used to allow external computer systems limited access to computer systems or information resources residing on the protected side of the firewall The details of firewalls and their operation are well known to those skilled in the art.

In addition to intranets and intemets, network firewalls may be used to form a third type of computer network known as an "extranet." An extranet uses a network firewall to separate an intranet from the Internet. The firewall must be negotiated, or crossed, to allow information to be transferred between the two computer networks. In this manner, an extranet may be utilized to extend intranet services, using the Internet, securely and selectively. The use of extranets for business-to-business commerce is a rapidly expanding area in the computer network market.

Similar to the problems resulting from the web server loading discussed above, a network firewall may also be overloaded by increased information requests for external computer systems, such as web browsers. A program application communicating across a firewall with databases is not very efficient, adding firewall bottlenecks and network performance problems. In an attempt to avoid firewall overloading problems and improve security, some developers are creating applications that separately negotiate the firewall such that part of the application resides on the intranet inside the firewall and part is outside the firewall. This is an expensive and application dependent solution. Alternatively, developers are creating applications that bypass the firewall and its protections by creating a permanent and unauthenticated communication channel through the firewall to allow access to computer systems or information resources on the other side of the firewall. This is a major security issue because a computer hacker may find the "bypass" or hole created in the firewall and cause damage to the data sources or applications residing on the computer network that need to be protected.

Problem—Lack of Management Tools

Another problem with current web technology is that there are no management tools available to allow computer network administrators to effectively monitor and manage information requests received by a server computer system from external computer systems.

In today's networked, client-server environments, all kinds of things can (and do) go wrong that cause information requests to fail. For example, request failures may occur due to computer network failure, communication errors, computer system failures, program application crashes, and file access errors, just to name a few. Current management tools do not provide for recovery actions in the event a fault or error occurs during the processing of the information request.

Furthermore, current management tools do not provide for efficient distribution of information requests received by a server computer system to effect load balancing for the server computer system and the computer network.

As can be seen, a need exists in the industry to provide a system for distributing, monitoring, and managing information requests on a computer network. Further, a need exists for a system that provides efficient distribution of information requests to effect load balancing for requests received by a server computer system. In addition, a need exists for a system that provides for monitoring and fault recovery for information requests received by a server computer system. Still further, a need exists in the industry to provide a system for securely distributing, monitoring, and managing information requests across a network firewall.

SUMMARY OF THE INVNTION

The present invention is a novel system and method for distributing, monitoring and managing information requests on a computer network. The present invention is preferably implemented on a computer network including one or more client computer systems networked to a first server computer system. The first server computer system is also preferrably networked to one or more secondary server computer systems. The client computer systems initiate or send information requests to the first server computer system on the computer network. When the client requests are received by the first server computer system, the client requests are intercepted and examined by a request broker software system of the present invention implemented on the first server computer system. The request broker software system acts as a central point to distribute, monitor, and manage information requests received by the first server computer system.

The request broker software examines the client request to determine the type of the information request and whether the request broker software is configured to distribute, monitor, and manage the request. Information is stored on the first server computer system regarding the capabilities and resources available on the first server computer system and the one or more secondary server computer systems. The request broker software examines this information to determine whether to process the request locally on the first server computer system or to distribute the request to one of the secondary server computer systems capable of processing the request.

If the request broker software determines that the client request is to be processed locally on the first server computer system, then the information request is processed on the first server computer system using local data sources accessible to the first server computer system. The results of the processing of the information request are returned to the client computer system that originated the request.

The request broker software of the present invention will also attempt to off-load or distribute the processing of the information request to the one or more secondary computer systems that are available and capable of processing the particular type of information request. The request broker software will distribute the client requests among the secondary server computer systems in a manner so as to load-balance or evenly distribute the requests among the secondary server computer systems. In addition, the request broker software will monitor the client requests and re-attempt the information request or initiate other recovery actions in the event a fault or error occurs during the processing of the information request.

It the request broker software determines that the information request is to be distributed to one of the secondary server computer systems, the information request is sent to the selected server computer systems to handle the processing of the information request. Information requests sent to a secondary server computer system are processed on the secondary server computer using local data sources accessible to the selected secondary server computer system. When the information request has been processed, the results are sent back to the request broker software implemented on the first server computer system. The request broker software then sends the results of the information request to the client computer system that originated the information request.

The present invention also provides for the distribution, monitoring, and management of information requests across a computer network in which the first server computer system is on the outside of a network firewall and the secondary server computer systems are on the protected side of the network firewall. The request broker software system of the present invention establishes a mutually authenticated communication channel across the network firewall with the secondary server computer system selected to process the information request. In this manner, limited and secure access may be provided to information and applications on server computer systems protected by a network firewall.

BRIEF DESCRIPTION OF THE DRAWINGS

For a more complete understanding of the present invention and for further objects and advantages thereof, reference may now be had to the following description taken in conjunction with the accompanying drawings in which like numerals are used for similar parts:

FIG. 5*a*, 5*b*, 5*c*, and 5*d* illustrate a typical Request Broker configuration file.

FIG. 6*a*, 6*b*, and 6*c* illustrate a typical Application Server configuration file.

DETAILED DESCRIPTION OF THE INVENTION

Figure 1:
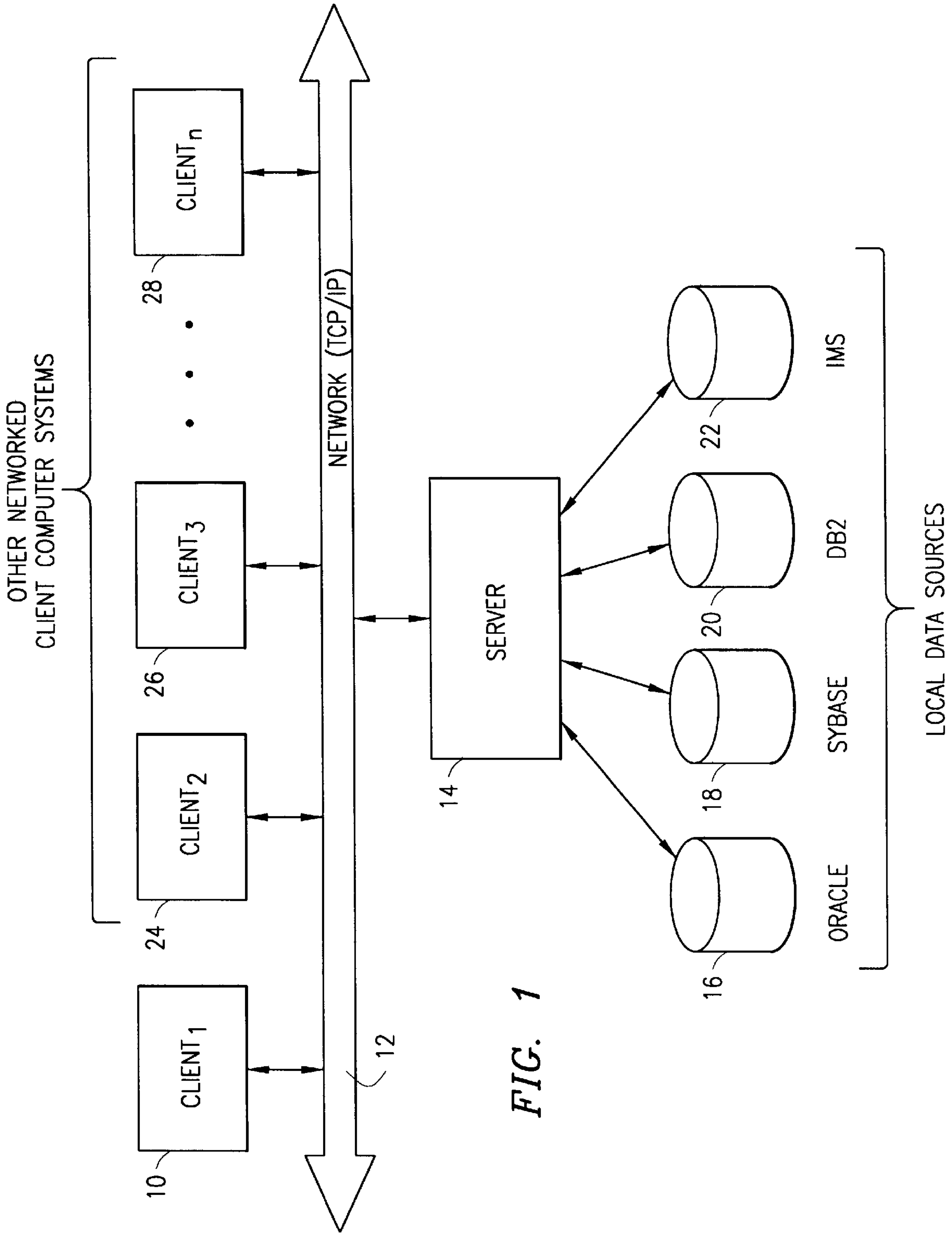
FIG. 1 illustrates a basic client-server computer network.
Figure 2:
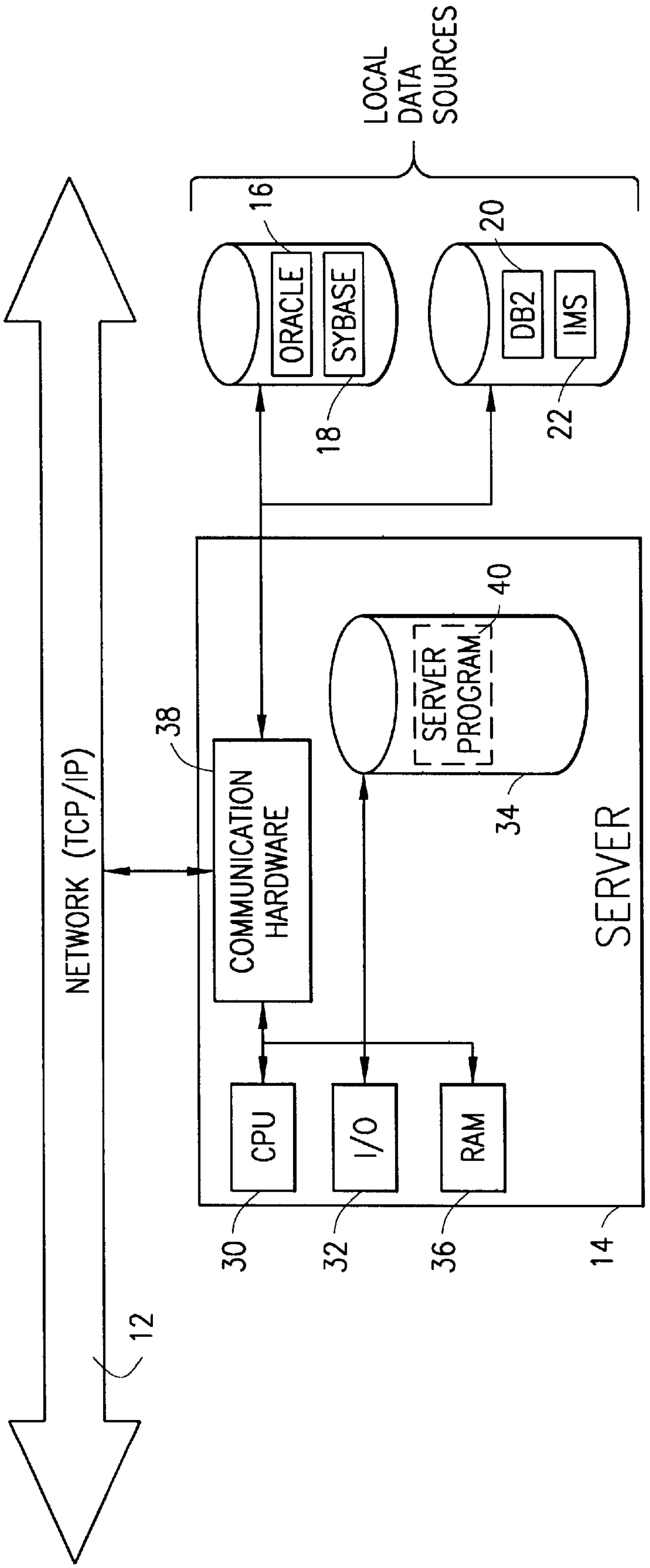
FIG. 2 illustrates conventional equipment for a server computer system.
Figure 3:
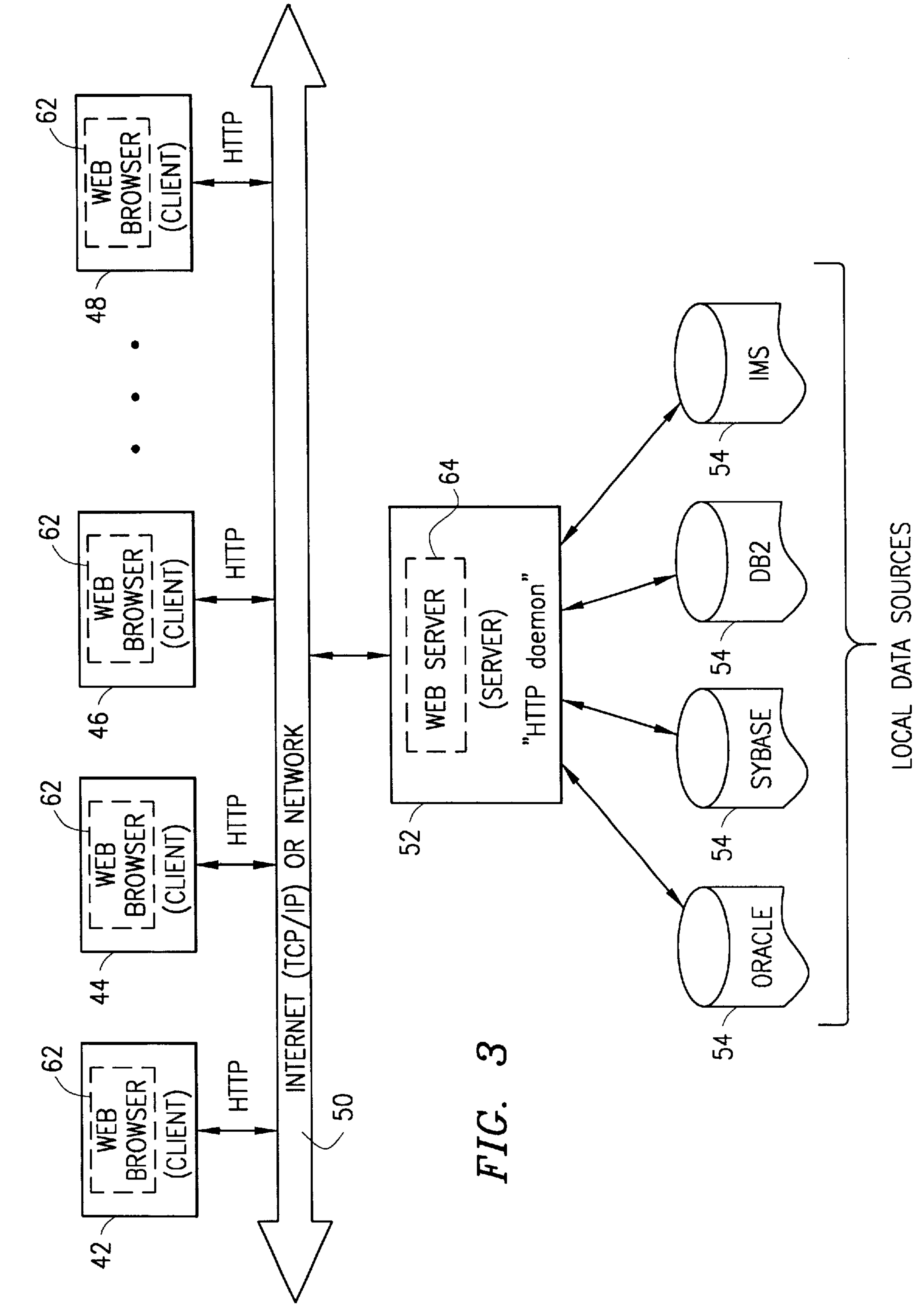
FIG. 3 illustrates a basic network diagram for the Internet or World Wide Web.
Figure 4:
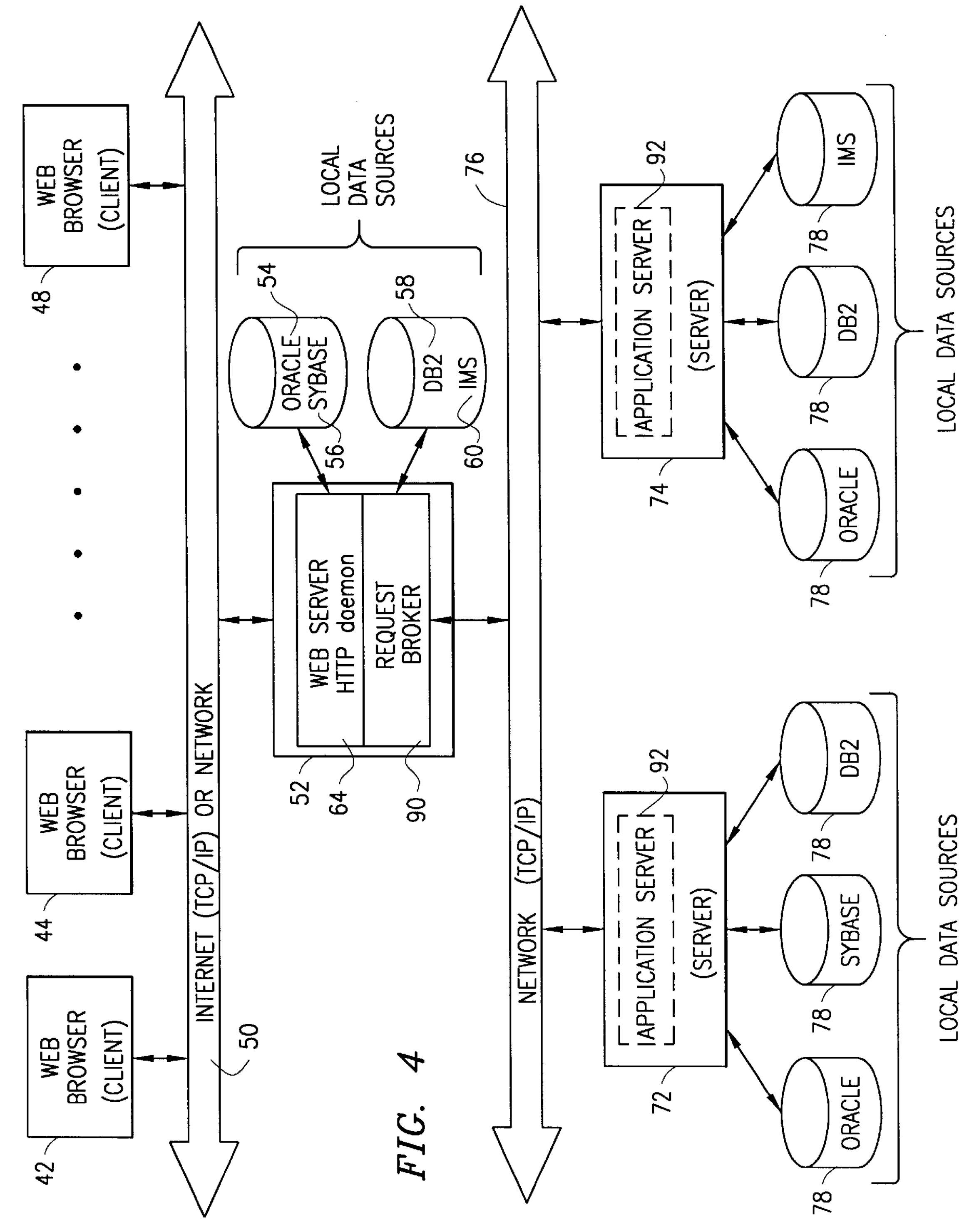
FIG. 4 illustrates a diagram of a computer network configured to implement the preferred embodiment of the present invention.

The present invention is a system and architecture for distributing, monitoring and managing information requests on a computer network. FIG. 4 is a block diagram showing a computer network configured to implement a preferred embodiment of the present invention. As can be seen from the diagrn, much of the network configuration is similar to that of FIG. 3. The network configuration of FIG. 4 differs in that web server computer system 52 is connected to one or more secondary application server computer systems 72,74 via a second network 76. Like the Internet or first network 50, the second network 76 may be implemented using any conventional network protocol such as TCP/IP. The secondary application server computer systems 72,74 are used to off-load client requests from web server computer system 52. Like web server 52, the secondary application server computer systems 72,74 are connected to local data sources 78.

The preferred embodiment of the present invention has two major components. The first component is the "Request Broker" and the second component is the "Application Server." The Request Broker 90 is a computer program that runs on web server computer system 52. The Application Server 92 is a computer program that runs on one or more of the secondary application server computer systems 72,74. The preferred embodiment of the present invention may be implemented on server computer systems operating either in Microsoft Corporation's Windows NT environment, UNIX environment, IBM MVS, or any other modern computer operating system. Server computer systems 52,72,74 may be of different types in that the present invention is computing platform independent.

The following description of the preferred embodiment of the present invention is implemented on a computer network that is connected and configured to communicate with the Internet, or WWW, or most any suitable computer network. As such, the client computer systems 42, 44, 46, and 48 connected to the first network 50 are running conventional web browser programs, and web server computer system 52 is running a conventional web server program 64. Web servers typically support "plug-ins" or application programming interfaces (API) enabling their basic functionality to be extended by software programs, typically called "plug-ins," that use the web server API to perform functions within the web server software.

In the preferred embodiment, Request Broker 90 is implemented as a server side plug-in module that extends the web server program's 64 normal processing power beyond that of a single web server machine. The Request Broker 90 determines how to optimally route information requests received by the web server computer system 52, enabling requests to execute locally on the web server computer system 52 or remotely on one or more secondary application server computer systems 72,74. The Request Broker 90 also handles fault recovery for the requests and may be configured to act as a local "application server" such that requests may be processed locally on the web server computer system 52.

The Application Server 92 is a computer program that operates on an application server computer system 72,74 that is connected, via second network 76, to web server computer system 52 running Request Broker program 90. As shown in FIG. 4, one or more application server computer systems 72,74 implementing the Application Server program 92 may be networked to a Request Broker 90. The Application Server 92 receives requests from the Request Broker 90, executes the request on the application server computer system 72, 74 using local data sources 78 that the application server computer system 72,74 has access to, such as databases or applications. The Application Server 92 then returns the results of the request processing back to the Request Broker 90. Application Server 92 may be a program specifically designed for servicing certain types of information requests (such as CGI requests), and may also service other types of information requests, including but not limited to WinCGI, UNIX CGI, Active Server Pages, Java servlets, JavaScript, Corba, or IIOP.

In the preferred embodiment, the Application Server 92 is not required to communicate to a Request Broker 90 through a web server program 64, but is designed to support communication sessions between the Request Broker 90 and the Application Server 92. In addition, Application Server 92 can be a stand alone software program or a standard vendor web server program, or a standard web server program outfitted with additional software (such as software interfacing with the web server's plug-in API) enabling it to act as an Application Server 92. It is also possible for Request Broker 90 and Application Server 92 program code to co-reside within the same program address space.

1. Installation and Configuration Information

In the preferred embodiment of the present invention, the Request Broker 90 and Application Server 92 program modules are initially installed on their respective server computer systems using an installation procedure (not shown). During the installation procedure, a configuration file is generated for each Request Broker 90 and Application Server 92 installed. The configuration file contains information related to the server computer systems implementing the present invention, and their capabilities. This information is used to configure and operate Request Broker 90 or Application Server 92 program modules on the server computer systems. Each Request Broker 90 or Application Server 92 implemented on a server computer system has its own configuration file.

The configuration information is stored on the server computer system's data storage device 34 and loaded into memory, such as the server computer system's RAM 36, when the Request Broker 90 is initialized by the web server program 64, or when the Application Server program 92 is initialized by its application server computer system 72,74, or web server program 64.

Request Broker Configuration File

A typical Request Broker configuration file is shown in FIGS. 5*a* through 5*d*. The configuration file contains a number of categories of information related to the Request Broker 90 operation. For example, category "Broker Configuration" 79 contains a number of variable values, such as AdapterEnable, MaxConnections, MaxContentServers, LocalFallback, and UseLocalPool. The "AdapterEnabled" value indicates whether the Request Broker 90 is enabled to handle requests from the web server program 64. The "MaxConnections" value indicates the maximum number of concurrent communications sessions (e.g., TCP/IP sockets) to be opened by the Request Broker 90 with any Application Server 92. The "MaxContentServers" value indicates the maximum number of local concurrent request processes that will be attempted on the Request Broker 90. The "LocalFaliback" value indicates whether the pool of local data sources on the Request Broker 90 will be used when the remote network Application Servers 72,74 fail. The "UseLocalPool" value indicates whether the Request Broker 90 will act as a local application server by using the pool of local data sources in conjunction with the remote network Application Servers 72,74.

Category "Network Configuration" 80 in the Request Broker configuration file contains information that identifies Application Servers 92 running on remote server computer systems 72,74 that are connected to the Request Broker 90. Information such as Application Server computer system host names, their communication port addresses, and whether the Application Server 92 is enabled or disabled (e.g., the "ServerEnabled" value) is stored in this category.

Category "Fault Handling and Communications Options" 81 in the Request Broker configuration file contains information relating to fault recovery parameters. For example, the "MinFreeKB" value sets the minimum amount of free RAM space available for additional request processing. The "BaseNetTimeout" value sets the amount of time the Request Broker 90 will give a request that was processed on a remote application server computer system 72, 74 before considering it a failed request attempt. The "BaseCgiTimeout" value sets the amount of time the Request Broker 90 will give a CGI type program request to finish processing before considering it a failed request attempt. Different timeout values may be set for other types of information requests. The "CommFailRetry" value sets the minimum number of requests the Request Broker 90 will process before attempting to re-establish communication with a networked application server system 72,74 that has previously failed due to communication problems. The "RequestRetry" value sets the number of times the Request Broker 90 will retry a request before considering it a failed request attempt.

Category "File Types" 82 in the Request Broker configuration file contains information identifying the different request file extensions that the Request Broker 90 is configured to handle. For example, the Request Broker 90 may be configured to handle requests that involve the execution of files with different file extensions, such as ".exe" for executable program files, ".pl" for Perl program files, ".cgi" for CGI program files, ".bat" for batch program files, or ".asp" for Active Server Page files.

Finally, category "Directory Mappings" 83 in the Request Broker configuration file contains the directory mappings identifying which types of incoming requests the Request Broker 90 win handle. The Request Broker 90 recognizes and handles requests based on their "URL virtual directory paths," or URL virtual path. The "URL virtual path" of an incoming request is found in the request's URL. For example, in a request with URL "http://www.host.com/cgi-bin/cgitest-exe", the URL virtual path is "cgi-bin." If the URL virtual path "cgi-bin" is defined in the Request Broker's 90 directory mapping information in the configuration file, then the Request Broker 90 will attempt to handle the request processing. Otherwise, the Request Broker 90 will let the web server program 64 handle the request processing.

The information in the directory mappings also relates a URL virtual path with a physical directory path for the local server computer system. The directory mapping information also identifies the appropriate type of Filter Module to be used to process the type of request associated with the URL virtual path. For example, a request with a URL virtual path of "/cga-internall" may be mapped to a physical directory path of "/bmctww/wwi/bin/" and associated with a CGI Filter Module type. Filter Modules of the preferred embodiment of the present invention are discussed below.

Application Server Configuration File

Similar to the Request Broker 90, Application Server 92 also contains a configuration file with information used to control and operation the Application Server 92. A typical Application Server configuration file is shown in FIGS. 6*a* through 6*c*. The Application Server configuration file contains a number of categories of information. For example, category "Server Configuration" 84 contains a number of variable values, such as MaxContentServers, ListenQueue, MaxThreads, and NetworkServers. The "MaxContentServers" value indicates the maximum number of local concurrent requests processes that will be attempted by the Application Server 92. The "ListenQueue" value indicates the maximum number of requests that will be queued by the Application Server 92. The "MaxThreads" value indicates the maximum number of concurrent communication sessions (e.g., TCP/IP sockets) that the Application Server 92 will allocate and manage for commnunicating with all Request Brokers. The "NetworkServers" value indicates whether the Application Server 92 is configured to forward, or off-load, requests to any other Application Servers that may be connected or networked to the instant Application Server 92.

Category "Fault Handling" 85 in the Application Server configuration file contains information relating to fault recovery parameters. Similar to the Request Broker 90, the "MinFreeKB" value sets the minimum amount of free RAM space available for additional request processing. If insufficient memory is available, the Application Server 92 will not execute additional request processes, and return a "low resource" indication to Request Broker 90.

Similar to the Request Broker configuration file, category "File Type" 86 in, the Application Server configuiration file contains information identifying the different request file extensions that the Application Server 92 is configured to handle.

Finally, again like the Request Broker configuration file, category "Directory Mappings" 87 in the Application Server configuration file contains the URL virtual paths, or directory mappings, identifying which types of incoming requests the Application Server 92 is configured to handle. The information in the directory mappings also relates a URL virtual path with a physical directory path for the server computer system. The directory mapping information also identifies the appropriate type of Filter Module to be used to processed the type of request associated with the URL virtual path.

In addition, caching configuration information (not shown) may be stored in the configuration files for the Request Broker 90 or the Application Server 92. Caching configuration information may be used to deterrmine which request types for which the results are to be stored, or "cached," for later retrieval. This caching determination may be based upon a number of factors such as request type, URL vita path, or certain program requests. This capability is usefuil in situations where numerous requests are received for the same information. In such a case, the requested information may be retrieved from cache memory without having to fully process the information request. This caching configuration information may be stored in a Request Broker configuration file or an Application Server configuration file.

2. The Request Broker

The Request Broker 90 is implemented as a server side plug-in module interfacing with the web server program 64 through the web server plug-in API 65. As such, the Request Broker 90 operates inside the web server process, sharing both address space and thread of execution with the overall web server program 64. When the web server program 64 receives a request from a web browser 42, 44, 46, and 48 over the Internet or network 50, the web server program 64 passes the request to the Request Broker 90 which handles further processing of the request.

Figure 7:
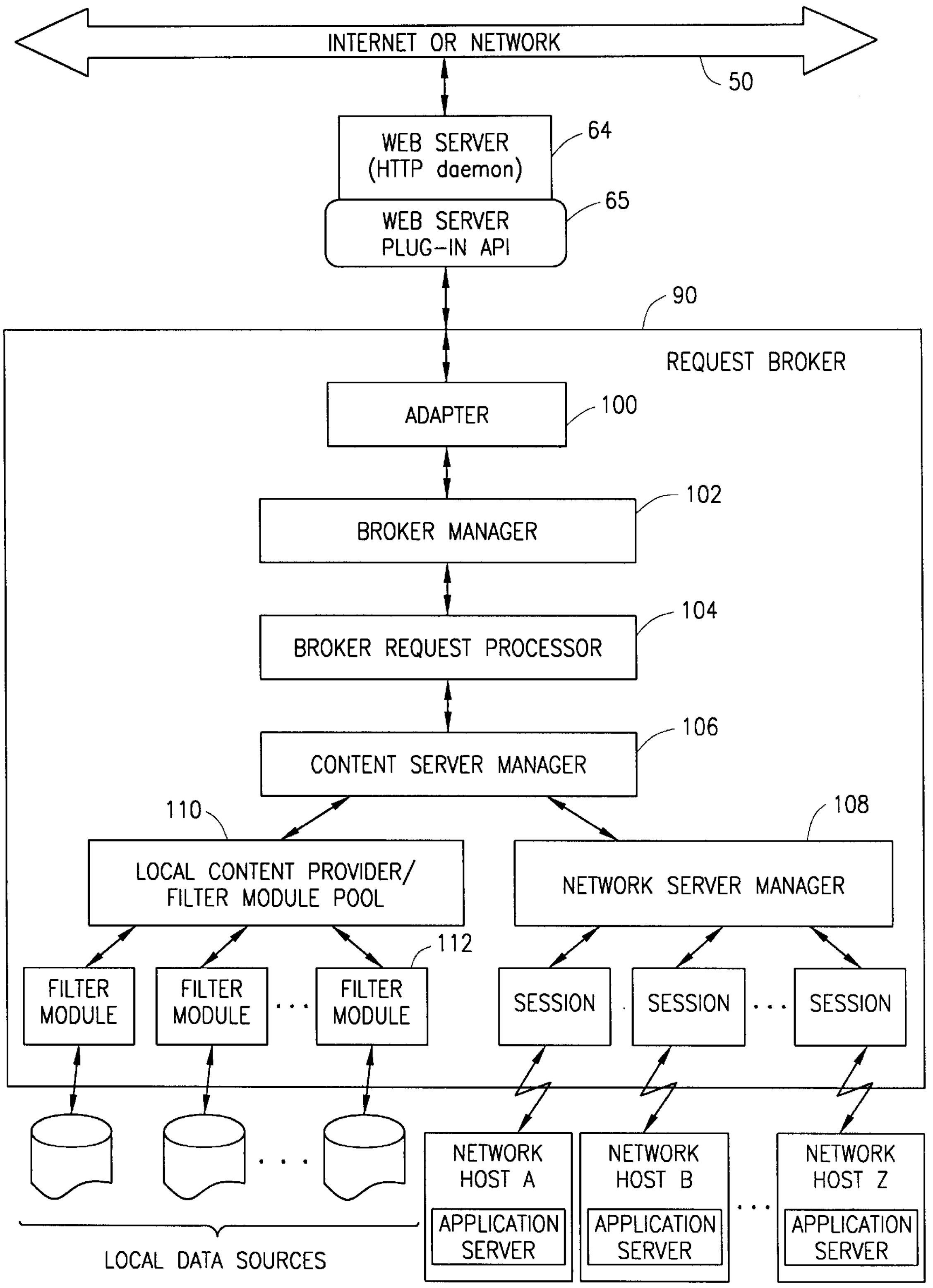
FIG. 7 illustrates the components of the Request Broker of the preferred embodiment.

As shown in FIG. 7, the Request Broker 90 has a number of functional components: an Adapter 100, a Broker Manager 102, a Broker Request Processor 104, a Content Server Manager 106, a Network Server Manager 108, a Local Content Provider/Filter Module Pool 110, and Filter Module objects 112.

Adapter

Figure 8A:
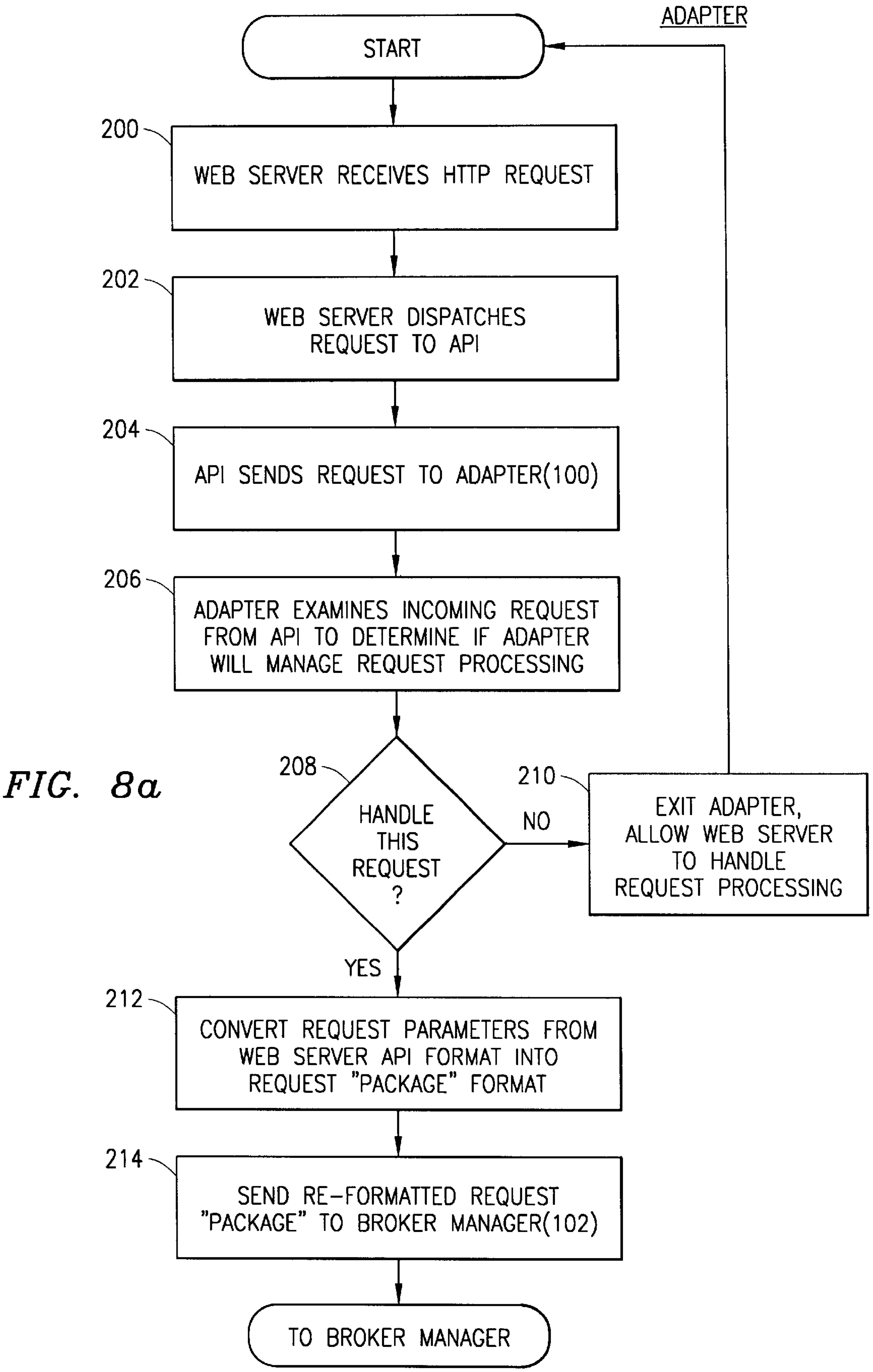
FIG. 8*a*, 8*b*, and 8*c* illustrate the finction of the Adapter of the preferred embodiment.

The Adapter 100 provides the interface between the Request Broker 90 and the web server program 64, through the web server plug-in API 65. As shown in FIG. 8*a*, in step 200, the web server program 64 begins by receiving an incoming HTTP request from a web browser 42, 44, 46, and 48 over the Internet 50. In step 202, the web server program 64 dispatches the incoming request to the web server API 65. In step 204, the web server API 65 sends the incoming request to the Request Broker 90. Next, in step 206, the Adapter 100 receives the incoming request from the web server API 65 and examines it to determine if the Request Broker 90 will handle the request.

Figure 8B:
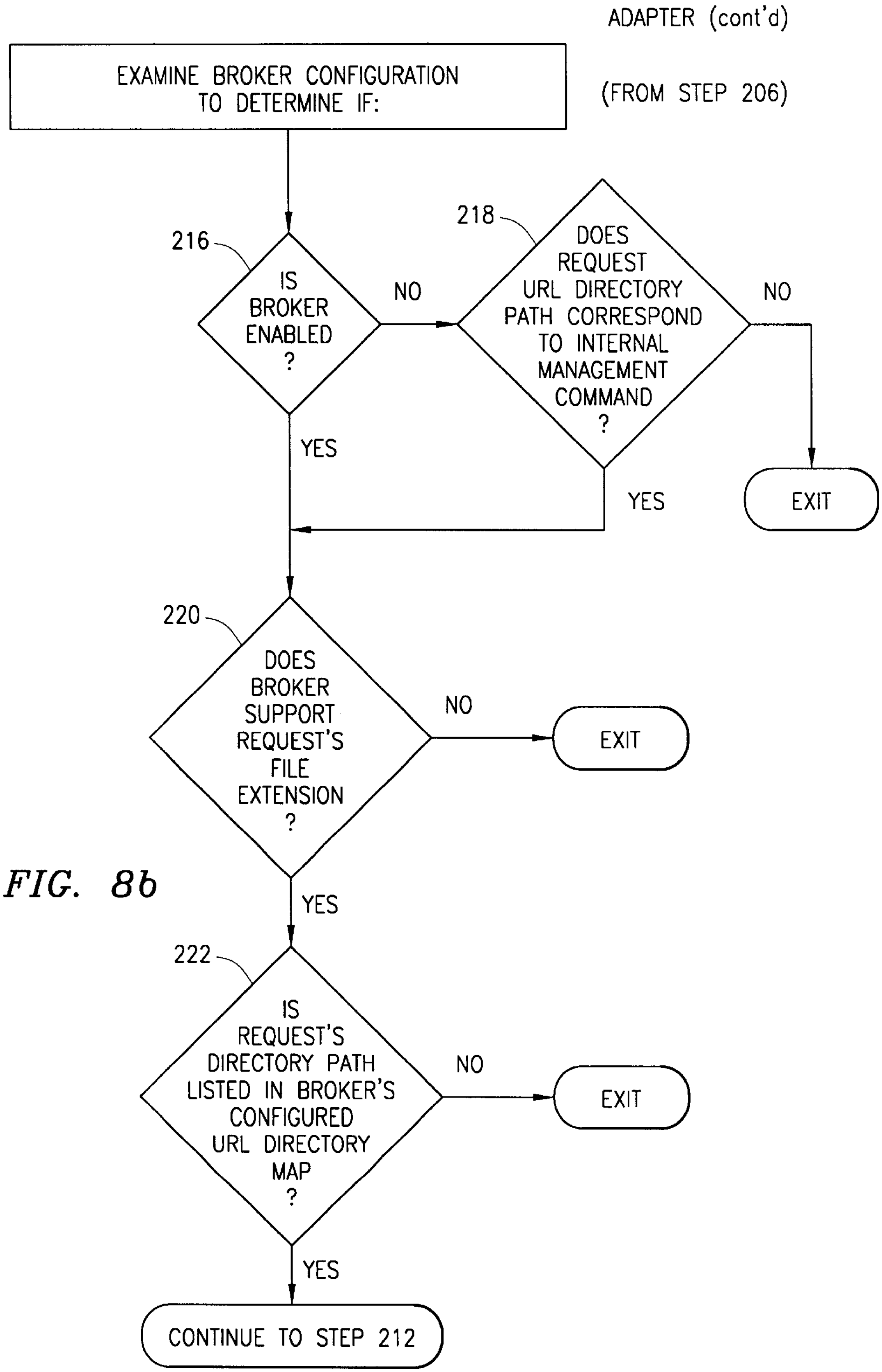

As shown in FIG. 8*b*, the determination of whether the Request Broker 90 will handle the incoming request in step 208 has a number of steps. The Adapter 100 examines the incoming request and examines the Request Broker's configuration information to determine whether the Request Broker 90 is configured to handle the processing of the request.

In step 216, the Adapter 100 examines the Request Broker configuration file to determine whether the Request Broker 90 is enabled to handle requests from the web server program 64. In this step, the Adapter 100 inspects the AdapterEnable value contained in the Request Broker configuration file. If the AdapterEnable value indicates that the Request Broker 90 is "disabled," then the Adapter 100 will proceed to step 218 where the request's URL virtual path is examined to determine whether the incoming request is an internal management command for Request Broker 90. Such internal management commands may be used to perform administrative functions for Request Broker 90 such as configuration change notifications, enabling or disabling the Request Broker 90, or queries regarding the Request Broker's internal state. If in step 218, it is not a management command, then exit and return the incoming request to the web server program 64 to allow the web server program 64 to process the incoming request.

If the Request Broker 90 is enabled or the incoming request is an internal management command, the Adapter continues to step 220. In step 220, the Request Broker's configuration file is examined to determine whether the Request Broker 90 is configured to support the request's file extension. If the request's file extension is not supported, then the Adapter 100 exits and returns the request to the web server program 64 to allow the web server program 64 to process the request. If the request's file extension is supported by the Request Broker 90, then the Adapter 100 continues to step 222.

In step 222, the Adapter 100 examines the Request Broker's configuration file to determine whether the request's URL virtual path is listed in the Request Broker's URL virtual paths that it is configured for. If the request's UIRL virtual path is not found in the Request Broker's list of URL virtual paths, then the Adapter 100 will exit and return the request to the web server program 64 to allow the web server program 64 to process the request.

Otherwise, the Adapter 100 continues on to step 212, where the request, and its parameters, are converted from the web server API request data format into new request "package" information format for continued processing in the Request Broker 90. This new request "package" data format is merely a data structure format used by the preferred embodiment of the present invention to facilitate processing of the request throughout the program modules of the preferred embodiment. The re-formatting of the request allows for more efficient and transparent processing of the request because different types of requests may be received from the web server program 64. Reformatting the incoming request to a consistent format allows different types of requests to be handled in the same manner within the preferred embodiment. As will be shown in a later step, after the request has been processed, the request "reply" format will be converted back to the request's original type of data format for transmission to the web browser 42, 44, 46, and 48 originating the request. This allows the preferred embodiment of the present invention to be easily adapted or modified to handle new or different data request formats.

After the inconing request has been reformatted into a new request "package," in step 212, the request "package" is sent to the Broker-Manager 102 for further processing.

Figure 8C:
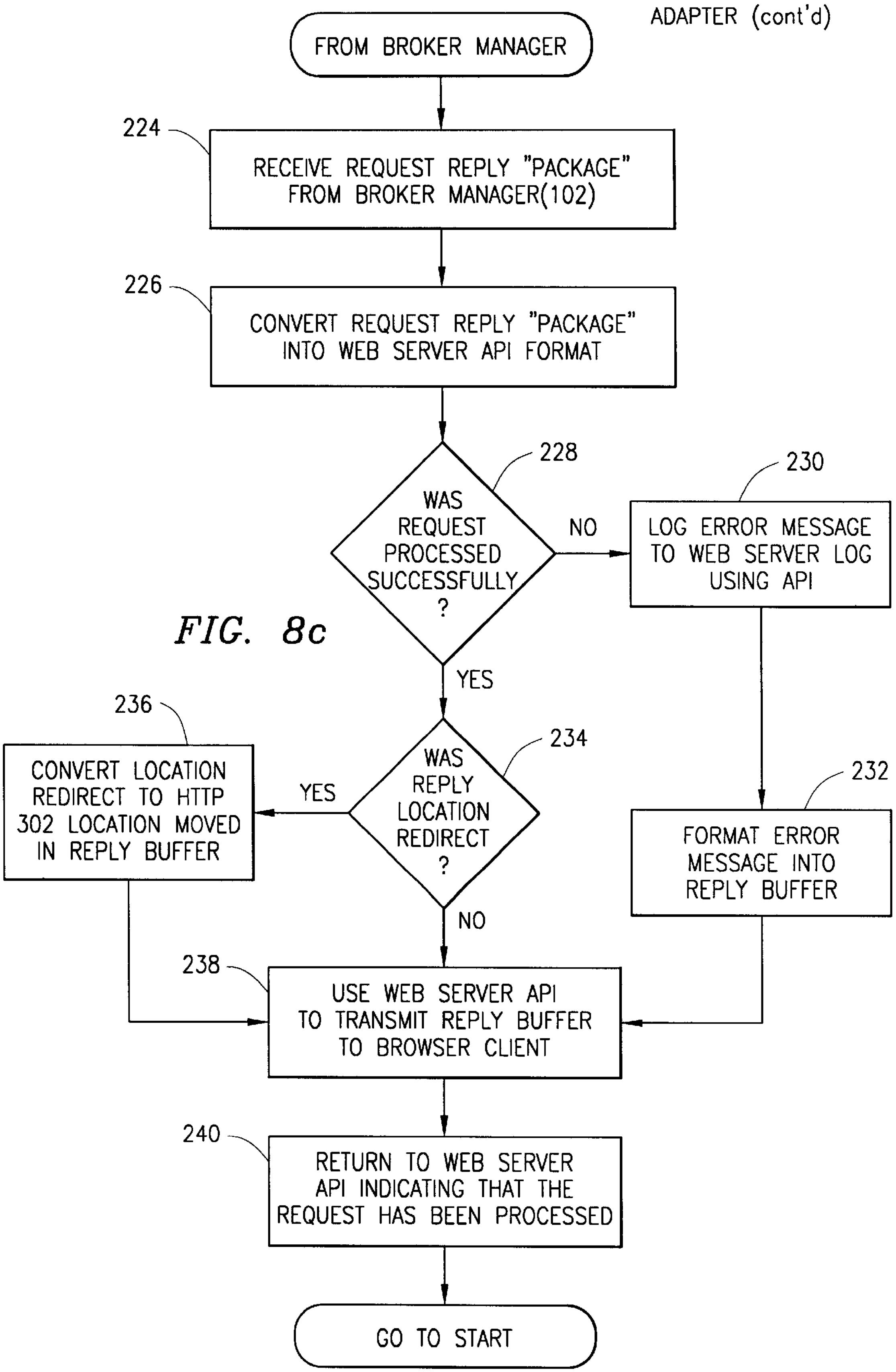

Referring to FIG. 8*c*, afterthe request has been processed by the Broker Manager 102, in step 224, the results of the request (the request reply "package") are sent from the Broker Manager 102 and received by the Adapter 100. In step 226, the request reply "package" data format is converted back into the web server's original API request format, stored in a request reply buffer (not shown), and transmitted back to the web browser client 42, 44, 46, 48 that originated the request.

In step 228, the status/error code contained in the request reply "package" is examined to determine whether the request was processed successfully. If the request was not processed successfully, then, in step 230, the error is logged to the Request Broker's error log file (not shown), and the error is logged to the web server program 64 through the web server API 65. In step 232, the error code is used to generate an error message which is put into the request reply buffer which is sent back to the web browser client 42, 44, 46, and 48 originating the request. Alternatively, a standard error message indicating an "application error" may be sent to the web browser if detailed error information is not necessary.

If the request was processed successfully, then in step 234, the request reply is examined to determine if the reply was a "302" location redirect. The "302" location redirect is a standard HTTP status code indicating that the request is being redirected to a different URL. If the request reply was location redirected, then in step 236, the location redirect is converted to the HTFP "302" location and moved into the request reply buffer. If the request reply was not location redirected, then in step 238, the request reply buffer is transmitted back to the web server client 42, 44, 46, and 48 that originated the request using the web server API 65. In step 240, the Adapter 100 returns to the web server API 65 with a message indicating that the Request Broker 90 handled the request and that no further processing is required by the web server program 64.

Broker Manager

Figure 9A:
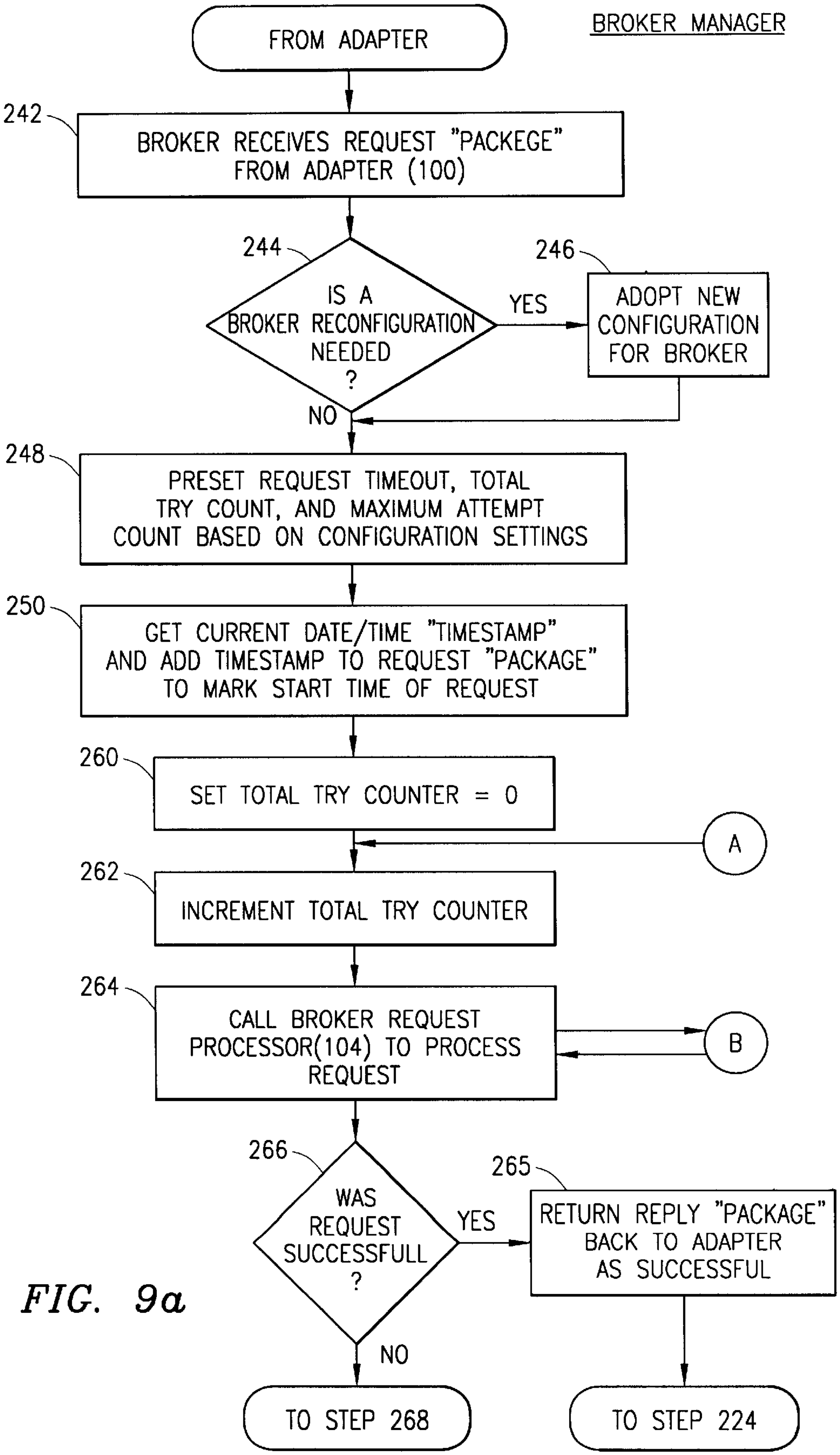
FIG. 9*a* and 9*b* illustrate the function of the Broker Manager of the preferred embodiment.

FIG. 9*a* illustrates the function of the Broker Manager 102 of the preferred embodiment of the present invention. In step 242, the Broker Manager receives the request "package" from the Adapter 100.

In step 244, the Broker Manager 102 determines whether a Request Broker reconfiguration is needed. In this step, the Broker Manager 102 checks to see if a configuration change notification event has been initiated. A configuration change notification event is generated when the configuration settings for the Request Broker 90 have been changed. The notification event is recognized by all threads or processes running on the Request Broker 90.

If a configuration change notification event is detected, then in step 246, the Request Broker 90 reads the new configuration file information into memory, adopting the new configuration. When a configuration change is detected and adopted, certain internal data structures within the Request Broker 90 are reorganized and internal settings are adjusted in accordance with the new configuration information. However, such configuration changes are made so that any requests already being processed by the Request Broker 90 are not affected by the new configuration changes, but will finish processing using the old configuration settings. In this manner, the configuration changes are considered "bumpless," in that no "bump" or disruption of service or processes takes place during the reconfiguration process. This manner of bumpless reconfiguration is important for applications which would be adversely impacted by suspending process execution for the implementation of configuration changes, resulting in "zero-downtime" administrative benefits for high availability environments.

If no reconfiguration changes are pending, then in step 248, fault recovery parameters are assigned to the request "package." Based upon settings in the Request Broker configuration file, these fault recovery parameters include, but are not limited to, setting request timeout parameters, a total try count, and a maximum attempt count. These parameters are used to determine when and how to attempt to resubmit a failed request for re-processing.

In step 250, the current date and time stamp is obtained and assigned to the request "package." This date/time stamp is used to mark the start time of the request processing. Next, in step 260, the "total try counter" is set to zero. The "total try counter" is used to keep track of the number of times a request has been attempted. In step 262, the total try counter is incremented by 1.

Figure 10:
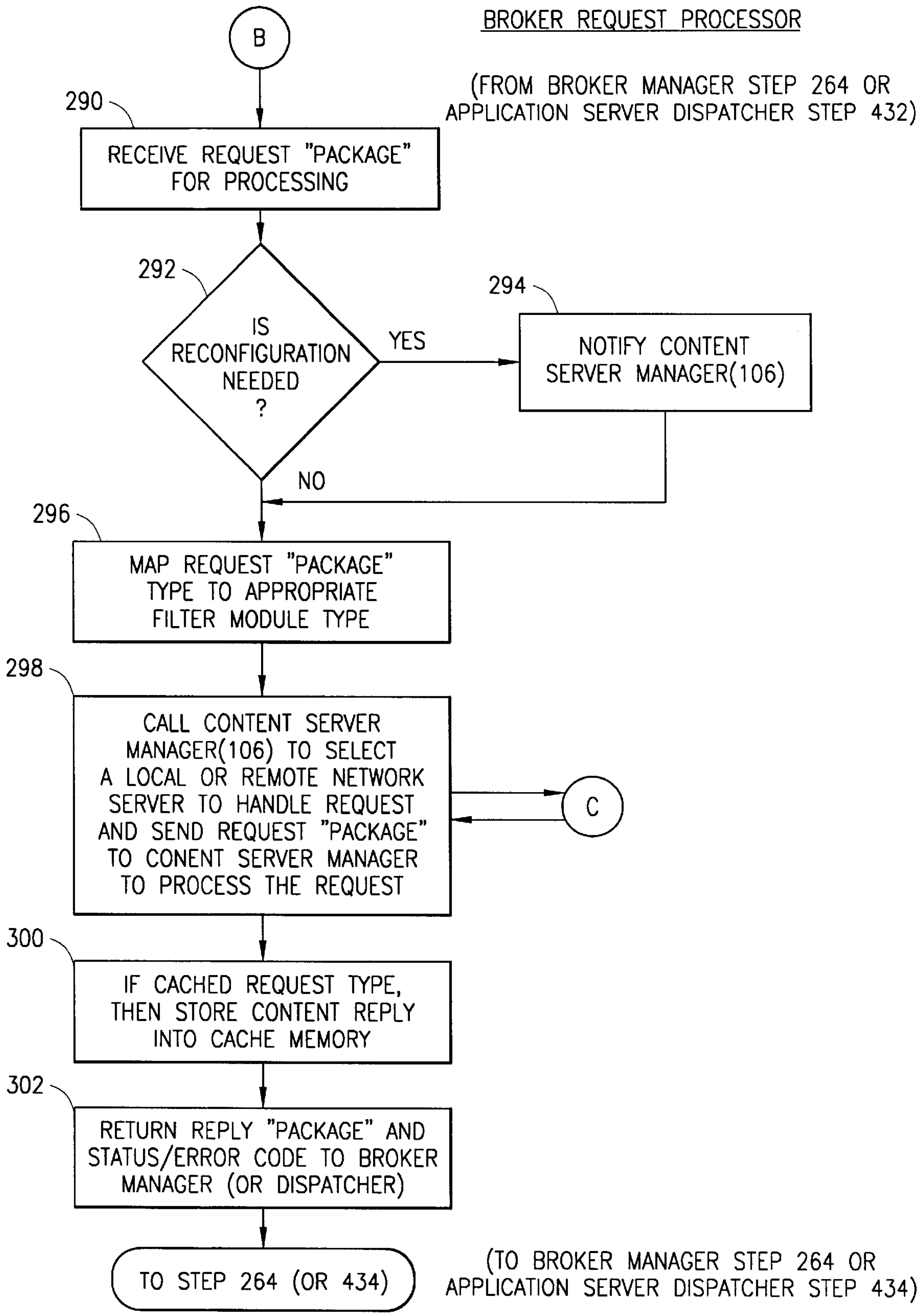
FIG. 10 illustrates the function of the Broker Request Processor of the preferred embodiment.

In step 264, the Broker Manager 102 calls the Broker Request Processor 104 to process the request "package." The steps of the Broker Request Processor 104 are shown in FIG. 10, and will be described later.

After the Broker Request Processor 104 has finished processing the request and returned the results to the Broker Manager 102, the Broker Manager 102 continues to step 266 where it is determined whether the request processing was successful. In this step, the error/status code associated with the request reply "package" is examined to determine if the request was processed without error. If the request processing was successful, then in step 265 the request reply "package" is returned to the Adapter 100 as successful in step 224.

Figure 9B:
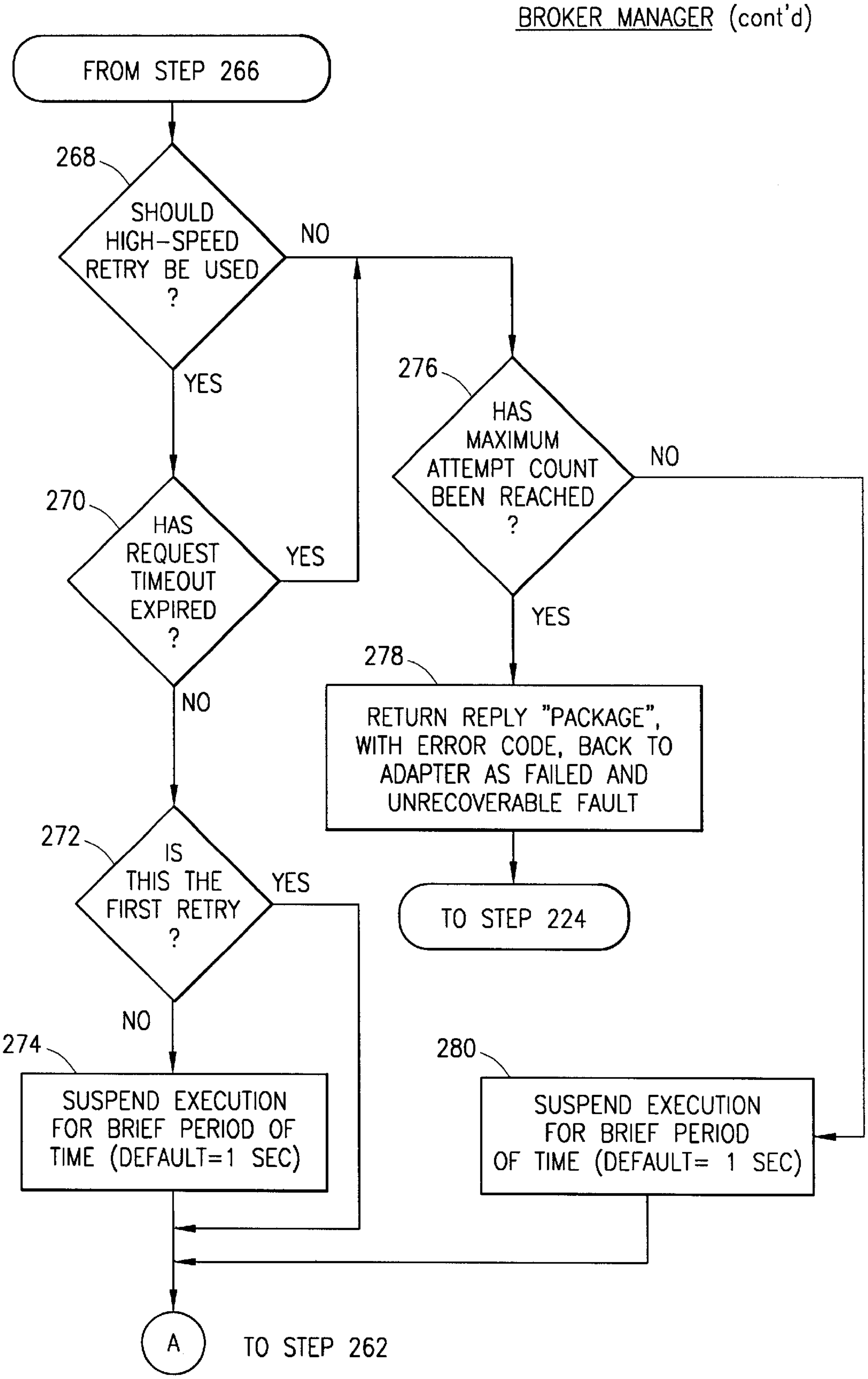

If the request processing was unsuccessful, then the Broker Manager continues to step 268. As shown in FIG. 9*b*, in step 268, the request reply "package" is examined to determine whether the failed request should be retried at the maximum rate using high-speed retries. For example, if the request failed because of a "bad filename" type error, then the request should not be continually retried. However, if the error was due to a communication problem, then the failed request should be retried at the maximum rate using high-speed retries. The determination in step 268 depends upon the specific error code type.

If it is determined that the request should be retried, then in step 270, the request timeout parameters are examined to determine whether the allotted request processing time has expired. If the request timeout parameters have not expired, then the Broker Manager continues to step 272. In step 272, the "total try counter" is examined to determine whether this is the first retry for the failed request. If it is the first retry, then step 274 is skipped in order to cause one initial, immediate retry, and the failed request is reattempted beginning with step 262. If it is not the first retry for the failed request, then in step 274, the request processing suspends for a predetermined brief period of time (default =1 second) before the request is retried beginning at step 262.

If, in step 268, it is determined that a high-speed retry should not be attempted, or in step 270, it is determined that the request timeout has expired, then this request "attempt" is considered complete, and in step 276, the "total try counter" is compared with the "maximum attempt count" to determine whether the predetermined maximum number of request attempts has been reached. If the maximum has been reached, then in step 278, the request reply "package," with its statuslerror code, is returned to the Adapter 100 in step 224 as a failed and unrecoverable fault.

If the maximum attempt count has not been reached, then in step 280, the request processing suspends for a predetermined brief period of time (default =1 second). Then, the failed request is retried in step 262 (see label "A" in FIG. 9a).

Broker Request Processor

In step 264 of FIG. 9a, the Broker Manager 102 calls the Broker Request Processor 104 to process the request "package." FIG. 10 shows the steps of the Broker Request Processor 104, labeled as sub-process "B" in FIG. 9a.

In step 290, the Broker Request Processor 104 receives the request "package" from the Broker Manager 102. In step 292, it is determined whether a reconfiguration is needed by detecting whether a configuration change notification event is pending. If a reconfiguration is needed, then in step 294, the Broker Request Processor 104 notifies the Content Server Manager 106 that a reconfiguration is needed so that the reconfiguration event is propagated to Content Server Manager 106 and its sublayers. After the Content Server Manager 106 has been notified or if it is determined that a reconfiguration is not needed in step 292, then the Broker Request Processor 104 continues on to step 296.

In step 296, the request "package" is examined to determine the file type of the request. The file type of a request is also referred to as its "MIME" type. The term MIME refers to "Multimedia Internet Message Extensions" and defines the types of data files used on the Internet. For example, common MIME file types include the "htm1" file type for HTML files, and the "jpeg" and "gif" file types for graphics image files. The details of MIME file types are well known to those skilled in the art. In step 296, the request type is used to determine the appropriate type of Filter Module 112 of the preferred embodiment to associate, or map, to the request. The details of Filter Modules 112 of the preferred embodiment are described in a later section.

After the request has been mapped to an appropriate type of Filter Module 112, then in step 298, the Broker Request Processor 104 calls the Content Server Manager 106 to select a local or network server computer system to process the request "package," and to process the request (symbolieed as sub-process "C"). After the Content Server Manager 106 selects an appropriate server computer system to process the request and processes the request, the Content Server Manager 106 returns to the Broker Request Processor 104.

Next, in step 300, the Broker Request Processor 104 examines the information in the configuration file for the Request Broker to determine whether the request reply content should be stored into cache memory on the web computer system 52 for later retrieval. If the reply contents are to be cached, then the reply contents are stored into cache memory on web server computer system 52.

In step 302, the request reply "package" and its status/error code are returned to the Broker Manager 102 at step 264.

Content Server Manage

Figure 11A:
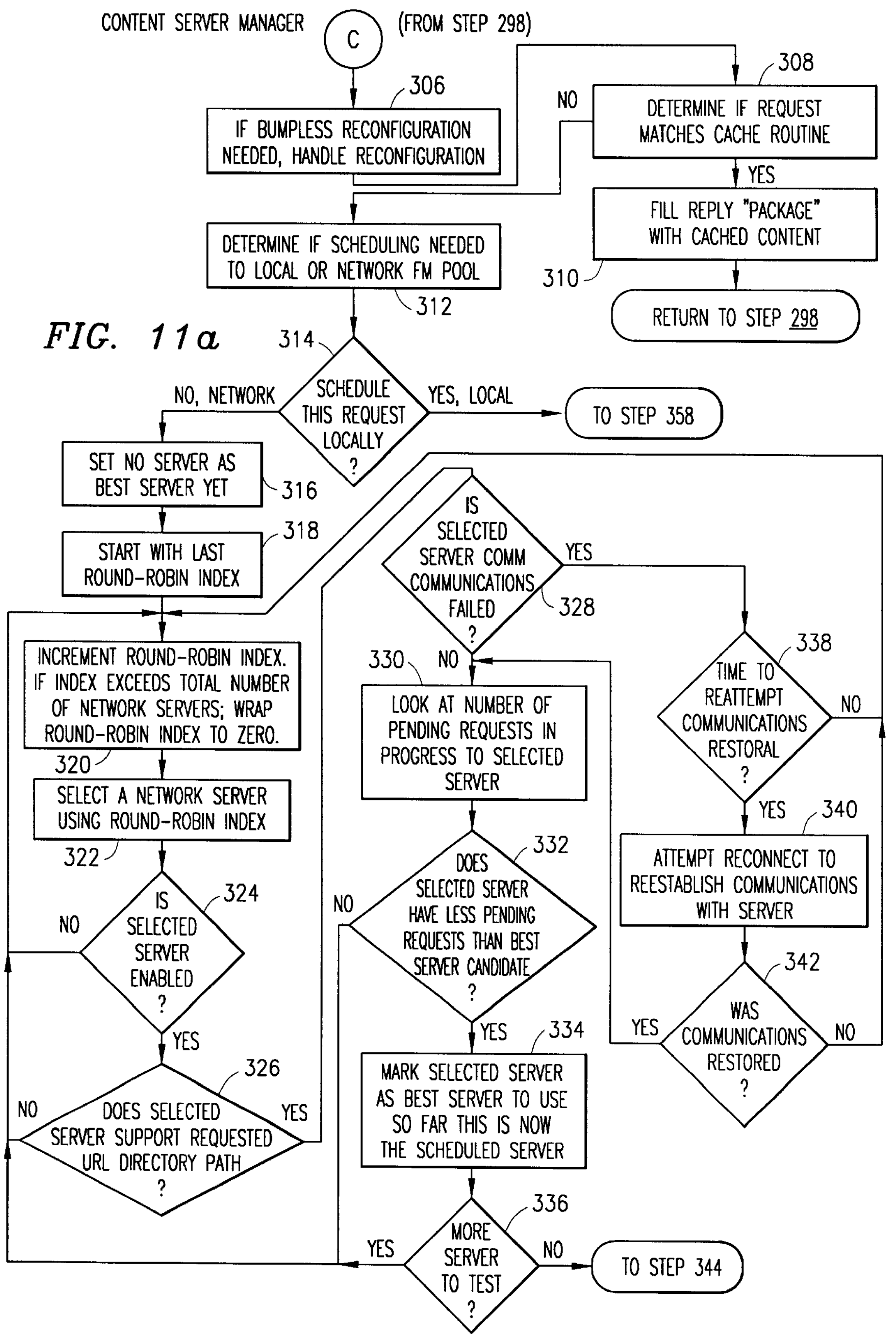
FIG. 11*a*, 11*b*, 11*c*, and 11*d* illustrate the function of the Content Server Manager of the preferred embodiment.

FIG. 11a illustrates the basic function of the Content Server Manager 106. In step 306, the Content Server Manager 106 determines whether a reconfiguration is needed. A reconfiguration is needed if a configuration change notification event is pending. If a reconfiguration is needed, then the Content Server Manager 106 reads the new configuration information file into memory and adopts the new configuration by adjusting data structures appropriately according to the new configuration file settings.

Next, in step 308, the request "package" and the Request Broker configuration file are examined to determine whether the request type matches any type of request that Request Broker 90 is configured to store in cache memory. If the request type matches the configured cached request type, then the request "package" is examined to determine whether information stored in cache memory matches the request. If the request matches the cached information, then in step 310, the reply "package" is filled with the previously cached information, and the reply "package" is returned to the Broker Manager 102 at step 298 (FIG. 10) with a status code of "successful."

If the request does not match any cached content, then in step 312, it is determined whether to schedule the request "package" to be processed locally, on the web server computer system 52 using local data sources, or to be processed remotely using networked Application Servers 92 running on server computer systems 72,74. In this step, the request is scheduled for local processing if there are (1) no Application Servers configured to handle the request processing for Request Broker 90 or (2) local interleave or local request handling is enabled. The Request Broker configuration information is examined to determine whether any Application Servers 92 implemented on application server computer systems 72,74 are configured to operate with the Request Broker 90. For example, the "NetworkServers" value in the Request Broker configuration file indicates how many, if any, Application Servers 92 are configured to operate with the Request Broker 90. In addition, the "LocalFallback" value in the Request Broker configuration file indicates whether the Request Broker 90 is configured to handle processing of requests using web server computer system 52 that the Request Broker 90 is installed on. If there are no Application Servers 92 configured for the Request Broker 90 and local processing is enabled, then the Content Server Manager 106 will continue to process the request locally at step 358. If all configured Application Servers 92 are identified as unavailable, for example, because of network communication problems, and local processing is enabled, the Content Server Manager 106 will continue to schedule the request to be processed locally as well.

Otherwise, the Content Server Manager 106 will attempt to schedule the request for processing using the network Application Servers 72,74. In step 316, the Content Server Manager 106 begins to schedule the request using any configured network Application Servers 72,74 by assigning the "Best Serve" candidate variable to "no server." In step 318, a starting round-robin server index value is selected. The round-robin server index is used to identify Application Servers 72,74 configured to process requests from the Request Broker 90. In step 318, the last round-robin server index is used to start the determination of which network Application Server 72,74 is selected to process the request. If this is the first request for Request Broker 90, then the round-robin server index starting value is zero.

In step 320, the round-robin server index is incremented. If the index equals or exceeds the total number of configured Application Servers 92 networked to the Request Broker 90, then the index is reset to zero. In step 322, round-robin server index is used to select an Application Server 92.

Next, in step 324, it is determined whether the selected Application Server 92 is enabled to process requests (according to this Request Broker's configuration file setting for the Application Server 92). In this step, the Request Broker's configuration file is examined to determine whether the configured Application Server 92 is enabled or disabled. ("ServerEnabled" value (80)). Using the configuration file, each Application Server 92 configured for a Request Broker 90 can be temporarily "disabled" for reasons such as periodic maintenance or scheduled server downtime. If the selected Application Server 92 is not enabled, then in step 320, the round-robin server index is incremented to select the next Application Server 92.

Otherwise, in step 326, the Application Server 92 list of published URL virtual paths is examined to determine whether the selected Application Server 92 supports the URL virtual path of the request to be processed. In this step, the request's URL virtual path is checked against the list of published URL virtual paths, or directory mappings, that are supported by the selected Application Server 92. The "published" URL virtual paths, or directory mappings, for each configured Application Server 92 are communicated to the Request Broker 90 when each communication session (e.g., TCP/IP socket), is established, and periodically thereafter.

In the preferred embodiment of the present invention, when each Application Server 92 is initially connected to a Request Broker 90, the Application Server 92 transmits or "publishes" a list of URL virtual paths, or directory mappings, to the Request Broker 90. The "published" list of URL virtual paths from the Application Server 92 identifies what types of requests that the particular Application Server 92 can handle. The Request Broker 90 stores the "published" list of URL virtual paths for each Application Server 92 in the Request Broker's RAM 36. The Request Broker 90 uses the lists to determine whether a particular Application Server 92 can handle a particular type of request.

Alternatively, the Request Broker 90 may be configured to use a list of URL virtual paths supported by each Application Server 92 maintained by a system administrator within the Request Broker's configuration file, which would alleviate the need for Application Servers 92 to publish their supported URL virtual paths. Alternatively, a Request Broker 90 could be configured to route requests to Application Servers 92 without regard to URL virtual paths, treating all Application Servers 92 as equal.

If a configuration change is made to a particular Application Server 92 changing the URL virtual paths supported by the Application Server 92, the Request Broker 90 is notified of the configuration change in the following manner. Each request reply transmitted from an Application Server 92 to the Request Broker 90 contains a date and time stamp of the latest configuration update for the particular Application Server 92. When the configuration of the Application Server 92 is changed, the configuration date/time stamp is also changed. When the next request reply is sent to the Request Broker 90, the Request Broker 90 will detect the changed configuration dateltime stamp from the Application Server 92. As a result, the Request Broker 90 will then transmit a request to the Application Server 92 to send updated configuration information to the Request Broker 90, including an updated "published" list of URL virtual paths supported by the Application Server 92. In addition, the Request Broker 90 can be configured to automatically request configuration updates from Application Servers 92 networked to the Request Broker 90. For example, Request Broker 90 may be configured to request reconfiguration updates once every ten minutes.

If, in step 326, the selected Application Server 92 does not support the request's URL virtual path, then, in step 320, the round-robin server index is incremented to select another Application Server. If it is determined that the Application Server selected in step 326 supports the request's URL virtual path, then, in step 328, it is determined whether the selected Application Server 92 is available to process requests or is unavailable due to network communication problems, or "communications failed." If the selected Application Server 92 is not "communications failed," then, in step 330, the number of pending requests in progress (i.e. previously dispatched) on the selected Application Server 92 is obtained. In step 332, it is determined whether the selected Application Server 92 has less pending requests in progress than the "Best Server" candidate. If the selected Application Server 92 does not have less pending requests in progress than the "Best Server" candidate, then go to step 320 and increment the round-robin server index to select and inspect the next Application Server 92.

If, in step 332, the selected Application Server does have less pending requests in progress than the "Best Server" candidate, then continue to step 334 and mark the selected Application Server as the "Best Server"candidate, making it the scheduled server to handle the request.

Next, in step 336, determined whether there are more Application Servers to test for scheduling purposes. If there are no more Application Servers to test, then go to step 344.

Back in step 328, if the selected Application Server 92 was in a "communication failed" state, then, in step 338, it is determined whether it is time to re-attempt to establish communications with the "communications failed" Application Server 92. In this step, the "CommFailRetryRate" value in the Request Broker configuration file is used to determine when to attempt to restore communications with a "communications failed" Application Server 92. The CommFailRetryRate value indicates the number of requests handled by the Request Broker 90 before the Content Server Manager 106 will attempt to re-establish communications with a "communications failed" Application Server 92. For the preferred embodiment, the default value for CommFailRetryRate is 100, such that the Request Broker 90 will handle 100 requests before attempting to re-establish communications with a "communications failed" Application Server 92.

If, in step 338, it is determined that it is not time to re-attempt to establish communications with the selected "communications failed" Application Server 92, then in step 320, the round-robin server index will be incremented to select another Application Server. If, in step 338, it is determined that it is time to attempt to re-establish communications with the selected "communications failed" Application Server 92, then, in step 340, an attempt is made to re-establish communications with the Application Server 92 using the Network Server Manager 108. In step 342, if communications with the selected Application Server 92 were restored, then go to step 330 to look at the number of pending requests in progress on the selected Application Server 92. If communications were not restored, then go to step 320 to increment the round-robin server index to select another Application Server.

Figure 11B:
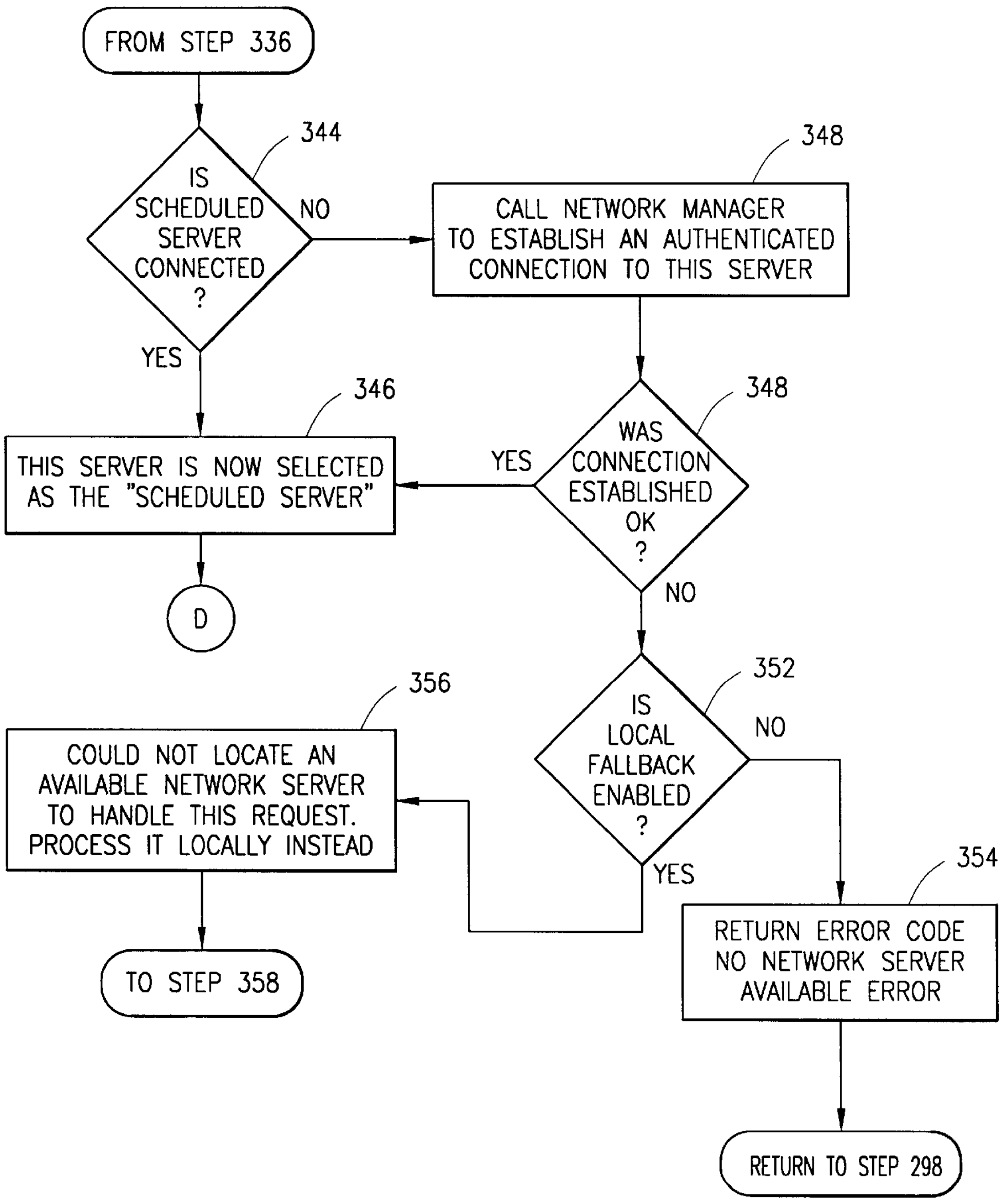

In step 344, shown in FIG. 11*b*, it is determined whether the Application Server 92 selected to process the request is connected to the Request Broker 90. In this step, the Network Server Manager 108 maintains a list of communication sessions, or TCP/IP sockets, established between the Request Broker 90 and all Application Servers 92. If there is no connection between the Request Broker 90 and the selected Application Server 92, then in step 348, the Network Server Manager 108 is called to establish a communication connection with the selected Application Server 92.

If the selected Application Server 92 is already connected to the Request Broker 90, then in step 346, the selected Application Server 92 is chosen as the "Scheduled Server" to process the request. In step 350, if the Network Server Manager 108 establishes a connection with the selected Application Server 92, then the Content Server Manager 106 continues to step 346, where the selected Application Server 92 is made the "Scheduled Server" to process the request. After the "Scheduled Server" is chosen, continue to step 366 (symbolized as sub-process "D").

The above described request scheduling process of the preferred embodiment of the present invention provides an efficient means to distribute the Request Broker's 90 information requests among the configured network Application Servers 92 so that the request processing load is evenly distributed, or load-balanced, among the configured Application Servers 92. The scheduling process skips inappropriate Application Servers 92, and selects the Application Server 92 with the least number of pending requests underway in a round-robin manner. This scheduling process is called a "modified round-robin" scheduler, such that it first attempts to load-balance the number of requests dispatched to each Application Server 92, and if all Application Servers 92 are balanced (with the same number of requests), then the round-robin scheduling will maintain the balance. Additionally, in the event that a networked server computer system fails (e.g., due to a server computer system crash or network communication failure), then the requests allocated to the failed server computer system will be re-allocated to the remaining Application Servers 92 to effect a dynamic load-balancing of the information requests.

In step 350, if the Network Server Manager 108 did not establish a connection with the selected Application Server 92, then the Content Server Manager 106 continues to step 352, where it is determined whether the request can be processed locally on the local server computer system. In this step, the "LocalFallback" value in the Request Broker configuration file is examined to determine whether the request can be processed locally when the network Application Servers 92 are unavailable. If local failback is not enabled, then the Content Server Manager 106 returns to step 298 of the Broker Request Processor 104 with an error code that there are no network Application Servers 92 available to process the request.

Figure 11C:
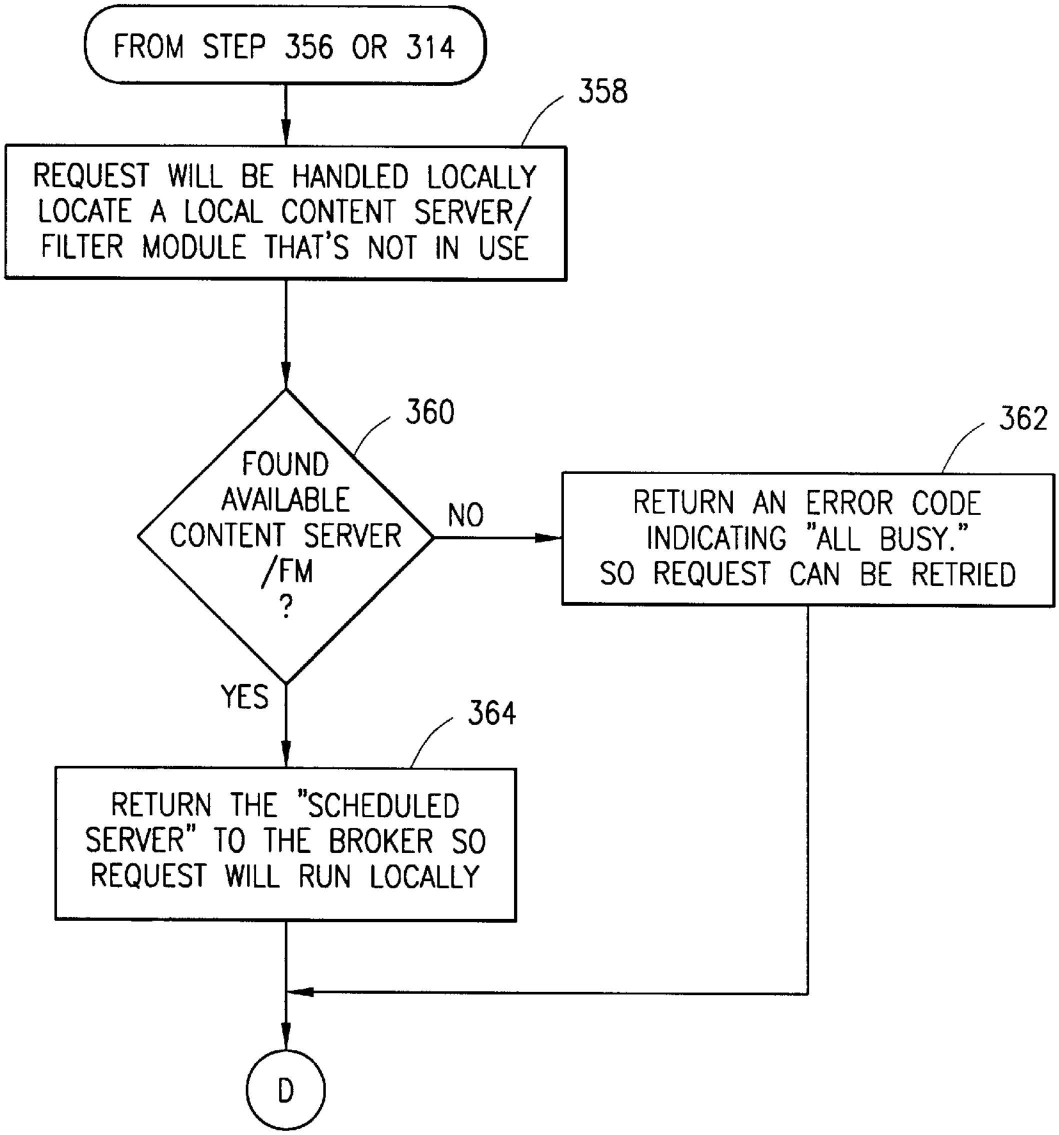

If local fallback is enabled, then, in step 356, the request will be forced to be processed locally on the local server computer system. If the request is to be processed locally, the Content Server Manager 106 continues to step 358, as shown in FIG. 11*c*. In step 358, where the Content Server Manager 106 will locate a Filter Module object 112 that is not being used to process a request. The details of Filter Modules 112 in the preferred embodiment of the present invention are described in a later section. The Request Broker 90 maintains a list of Filter Module objects 112 that have been initialized but are not being used to process a request. In this step, the Content Server Manager 106 examines this list of Filter Module objects 112 to determine whether one is available to process a request locally.

When the Request Broker 90 is initialized by the web server program 64 on the web server computer system 52, the Request Broker 90 initializes a predetermined number of Filter Module objects 112 that are configured to process information requests locally on the web server computer system 52. The "MaxContentServer" value in the Request Broker configuration file is used to determine the number of Filter Modules objects 112 that the Request Broker 90 is to initialize.

If a Filter Module object 112 is not available to process the request locally, then, in step 362, an error code indicating that there are no available Filter Modules to process the request is returned to the Broker Request Processor 104 at step 269. If an available Filter Module object 112 is found, then the Content Server Manager 106 continues to step 366 (symbolized as sub-process "D").

Figure 11D:
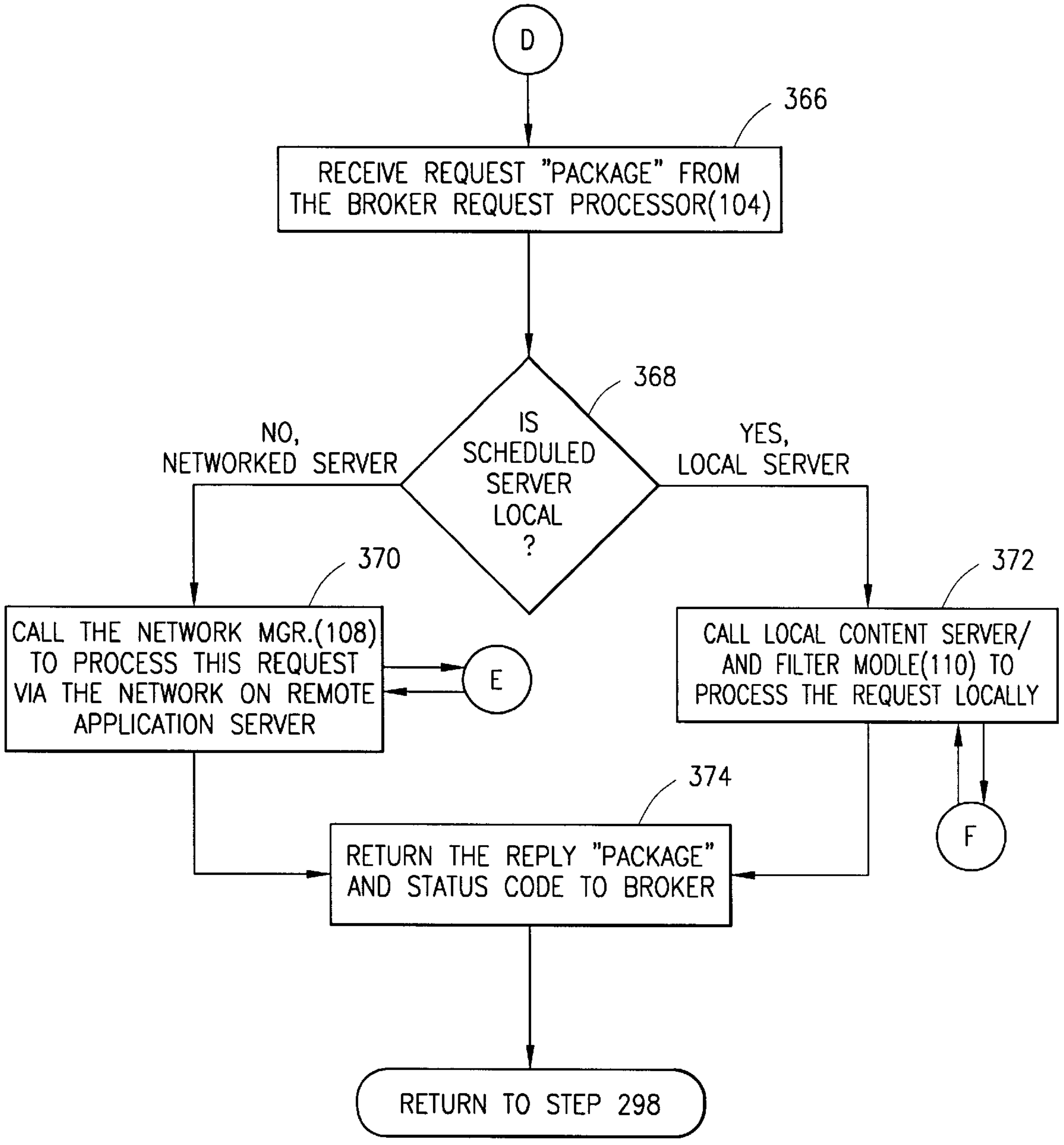

As shown in FIG. 11*d*, in step 366, the request "package" is received from the Broker Request Processor 104. In step 368, the "Scheduled Server" information is examined to determine whether the request is to be processed locally or on a network Application Server 92. If the "Scheduled Server" name is empty then the request is to be processed locally on the web server computer sysem 52. Otherwise, the "Scheduled Server" information will contain the host name of the network Application Server 92 that is selected to process the request remotely.

Figure 12:
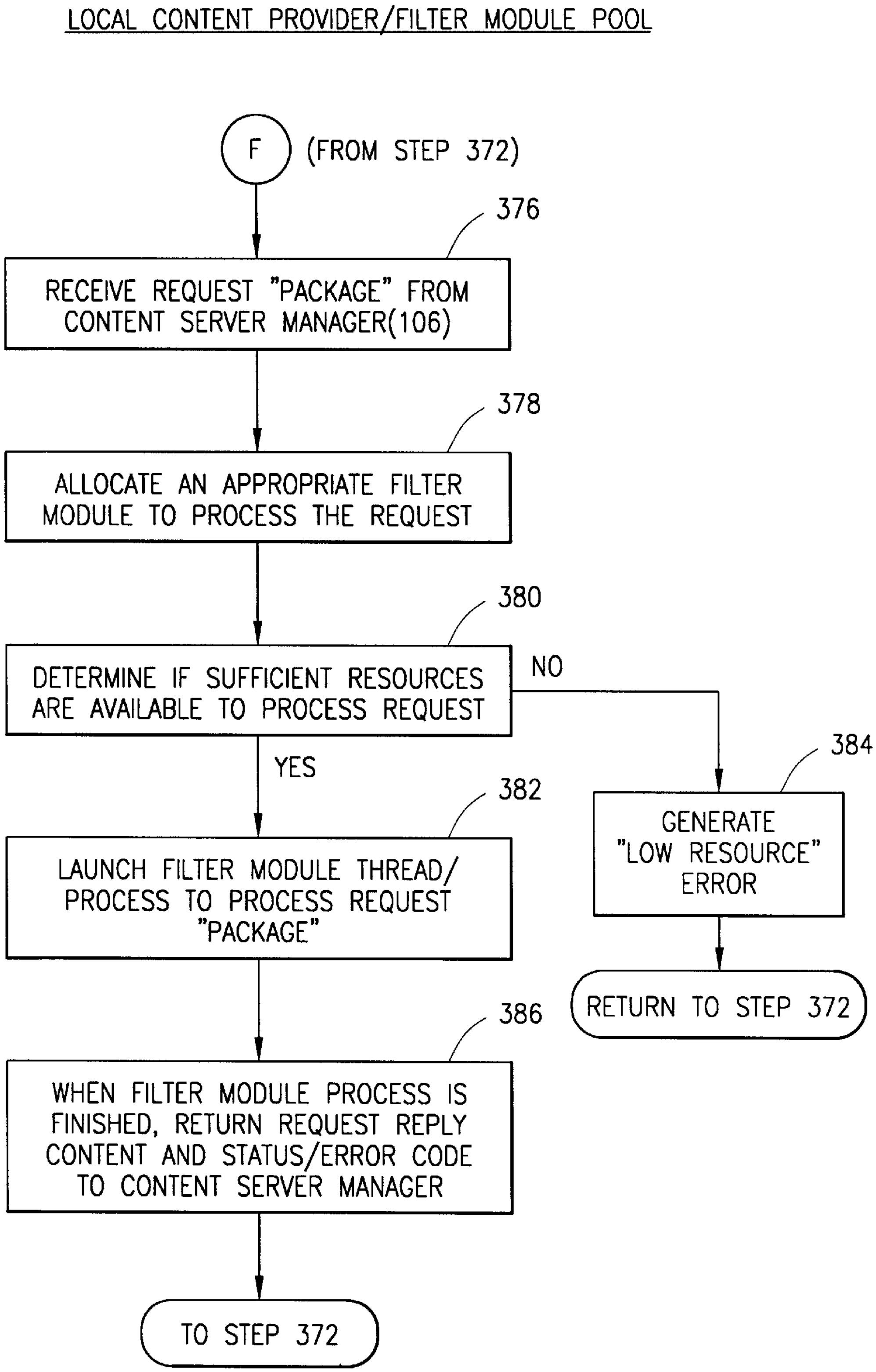
FIG. 12 illustrates the Local Content Provider/Filter Module Pool of the preferred embodiment.
Figure 13:
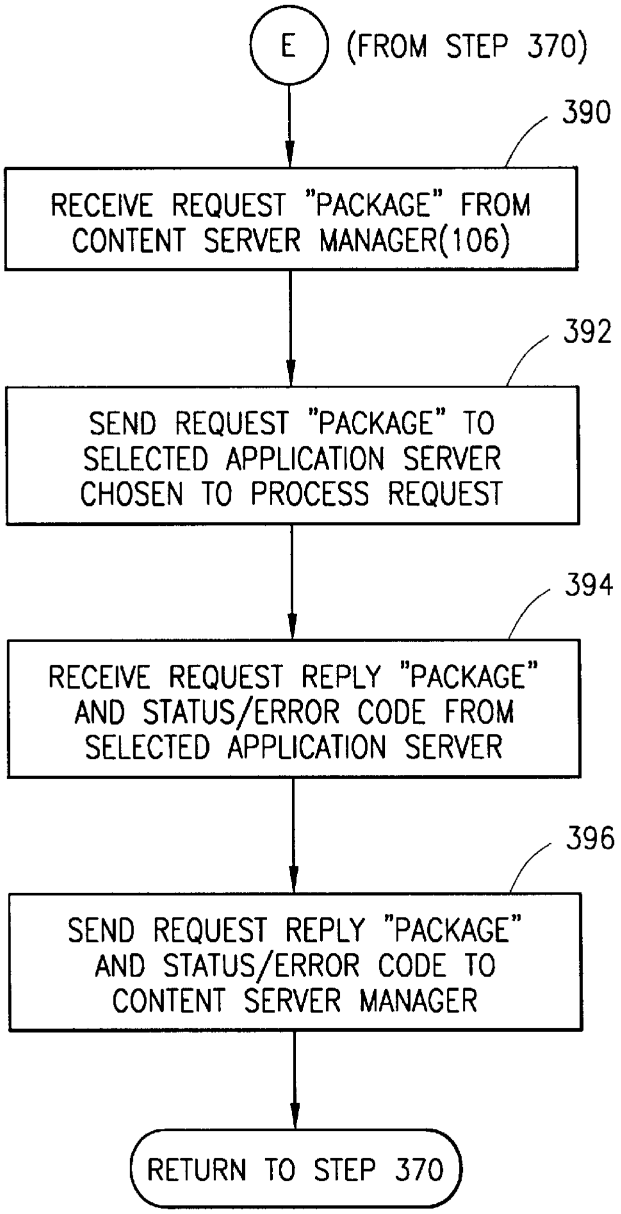
FIG. 13 illustrates the Network Server Manager of the preferred embodiment.

In step 370, if the request is to be processed using a networked Application Server 92, the Network Server Manager 108 is called to handle the remote processing of the request, symbolized as sub-process "E" and further shown in FIG. 13. Otherwise, the request is to be processed on the local server computer system 52. In step 372, the Local Content Server/Filter Module Pool 110 is called to process the request locally, symbolized as sub-process "F" and further shown in FIG. 12.

In step 374, after the request has been processed either locally or remotely, the request reply "package" and status/error code are returned to step 298 of the Broker Request Processor 104.

Local Content Server/Filter Module Pool

If the request "package" is to be processed locally on the web server computer system 52, the Content Server Manager 106 calls the Local Content Server/Filter Module Pool 110 to process the request, in step 372.

FIG. 12 shows the steps of the Local Content Server/Filter Module Pool 110. In step 376, the request "package" is received from the Content Server Manager 106. In step 378, the Local Content Server/Filter Module Pool 110 allocates an appropriate type of Filter Module object 112 to the request. In step 380, it is determined whether the local server computer system has sufficient computing resources to process the request. In this step, the MinFreeKB value in the Request Broker configuration file is examined to determine the minimum amount of memory required to initiate a request process. In addition, other computer system resources may be examined to determine if sufficient resources are available to handle the request process. For example, if insufficient UNIX processes are available to fork a process or insufficient file handles are available, in step 384, the Filter Module thread or process will not be launched and a "low resource" error code will be returned to step 372 in the Content Server Manager 106, so that the request can be retried later.

In step 382, if sufficient resources are available to process the request, then the Filter Module thread or process will be launched to process the request "package." In step 386, after the Filter Module thread or process is completed, the request reply content "package" and the status/error code are returned to the Content Server Manager 106 at step 372.

Filter Modules

In the preferred embodiment of the present invention, a Filter Module 112 is a server side plug-in software module that handles the processing of the request. The type of Filter Module 112 used to process the request depends upon the type of the request. Each Filter Module 112 executes as an independent process or thread of execution, providing a parallel processing environment. Filter Modules 112 are used to interface the Request Broker 90 or Application Server 92 of the preferred embodiment to a wide range of data sources, program applications, and API's. In the preferred embodiment, a "local data source" includes any interface accessible on the host machine that the Filter Module 112 uses to execute a process.

Filter Modules 112 can be implemented to handle requests involving different data formats, such as HTML, CGI, WinCGI, UNIX CGI, Active Server Pages, Java servlets, JavaScript, Corba, IIOP, web server API's (such as NSAPI or ISAPI), or RDBMS Native SQL (such as Oracle SQL/Net and Sybase OpenClient), and ASCII files, to name a few. How each particular type of Filter Module 112 processes a particular request depends upon the Filter Module 112. For example, a CGI Filter Module handles the processing of CGI type requests. The CGI Filter Module executes the CGI program using the CGI API protocol involving standard input and environment variables, obtains the reply content from the CGI program's standard output, such as an HTML data stream. Then, the CGI Filter Module packages up the result from processing the request, along with the completion status or error code, and returns the reply "package" to the Content Server Manager 106. Filter Modules 112 can be developed to handle any type of API or other external interface.

Network Server Manager

FIG. 13 shows the steps of the Network Server Manager 108 of the Request Broker 90. In step 390, the request "package" is received from the Content Server Manager 106. In step 392, the request "package" is sent across a communication connection (e.g., TCP/IP socket) between Network Server Manager 108 and the remote network Application Server 92 selected to process the request. The selected Application Server 92 receives the request "package and processes the request, generating a request reply content "package" containing the results of the request processing and a status/error code for the request. After the Application Server 92 has finished processing the request, the Application Server 92 sends the request reply content "package", along with the status/error code, back to the Net work Server Manager 108 using the connection between the Network Server Manager 108 and the selected Application Server 92, where the reply content "package" is received by the Network Server Manager 108 in step 394. In step 394, if the request timeout period expires or a request processing fault occurs (e.g., a network communication failure) such that no request reply or an incomplete reply is received from the selected Application Server 92, then an error is generated and returned to Content Server Manager 106 in step 396.

Then, in step 396, the Network Server Manager 108 sends the request reply content "package" and the statuslerror code back to Content Server Manager 106 at step 370.

3. The Application Server

The second main component in the preferred embodiment of the present invention is the Application Server 92. As shown in FIG. 4, the Application Server 92 is a software program that runs on one or more server computer systems 72,74 connected via computer network 76 to a server computer system 52 implementing the Request Broker 90.

Figure 14:
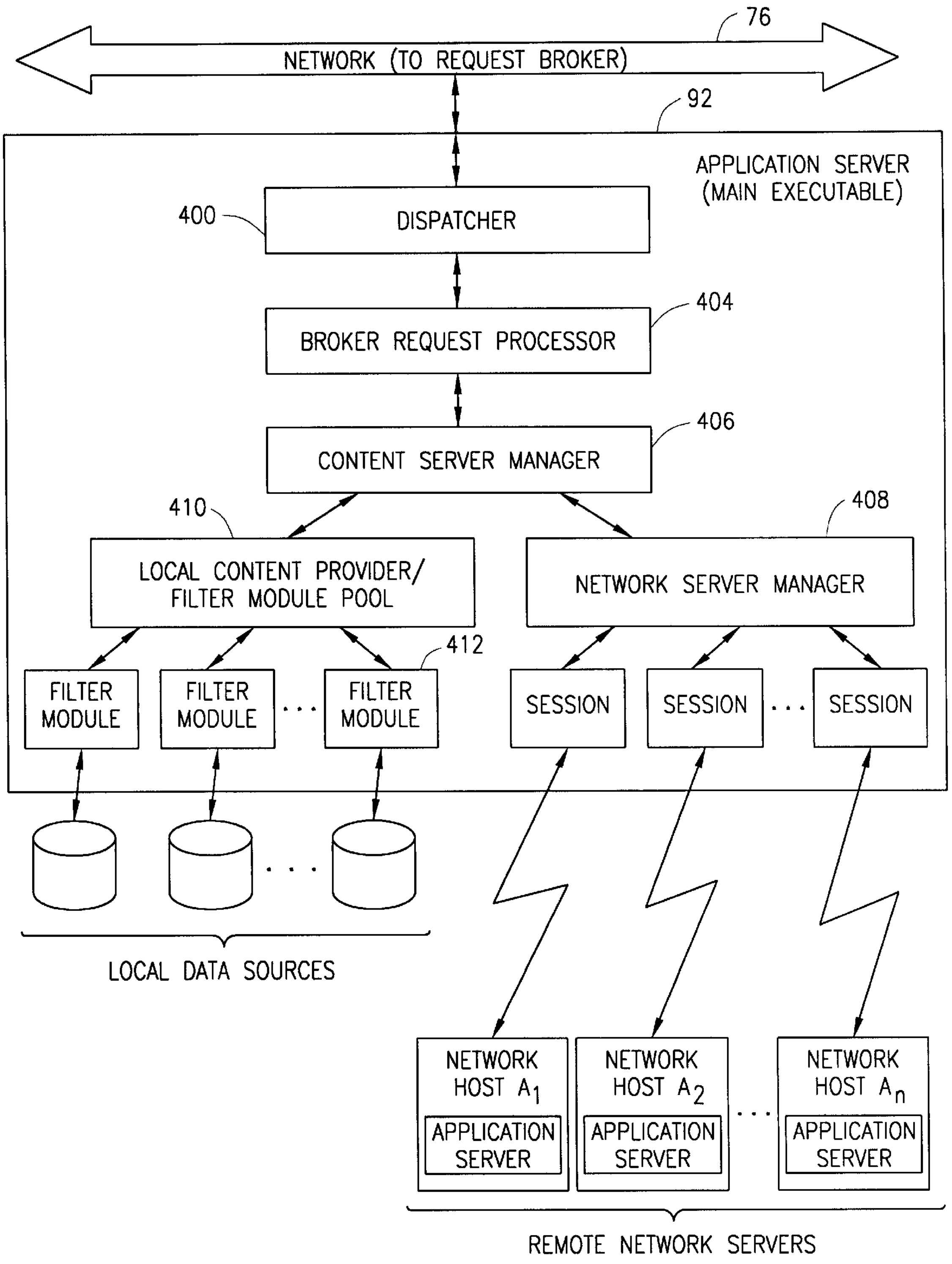
FIG. 14 illustrates the components of the Application Server of the preferred embodiment.

As shown in FIG. 14, Application Server 92 has a number of functional components: a Dispatcher 400, a Broker Request Processor 404, a Content Server Manager 406, a Network Server Manager 408, a Local Content Provider/Filter Module Pool 410, and Filter Modules 412. The Broker Request Processor 404, the Content Server Manager 406, the Network Server Manager 408, the Local Content Provider/Filter Module Pool 410, and the Filter Modules 412 can be functionally identical to the corresponding functional modules found in Request Broker 90.

In the preferred embodiment, the Application Server 92 differs from the Request Broker 90 in a couple of aspects. First, the Application Server 92 has a Dispatcher 400 instead of an Adapter 10. Second, the Application Server 92 does not have a Broker Manager 102 component. However, in alternative embodiments of the present invention, Application Server 92 may include a Broker Manager 102 component. Third, the Application Server 92 is a separate executable software program that runs on a server computer system 72,74 and does not necessarily interface to a web server software program 64 running on the server computer system 72,74. In an alternative embodiment, the web server program 64 implemented on a server computer system 72,74 could be used as the "dispatcher" module and serve as the framework for an Application Server 92.

In the preferred embodiment, if the Application Server 92 is implemented on a computer system operating under a Windows NT environment, then Application Server 92 is executed as a Windows NT "service." If the Application Server program 92 is implemented on a computer system operating under a UNIX environment, then Application Server 92 is executed as a "listener process" and one or more child processes and/or threads.

Similar to Request Broker 90, Application Server 92 uses Filter Modules 112, 412 to handle the processing of requests received from its Request Broker 90. In addition, Application Server 92 can be configured to process requests remotely using other network Application Servers 92 that are connected to the Application Server computer system 72,74. In this manner, an architecture can be implemented to create a hierarchy of networked Application Servers 92 to distribute and process information requests received from one or more Request Brokers 90.

Dispatcher

Figure 15A:
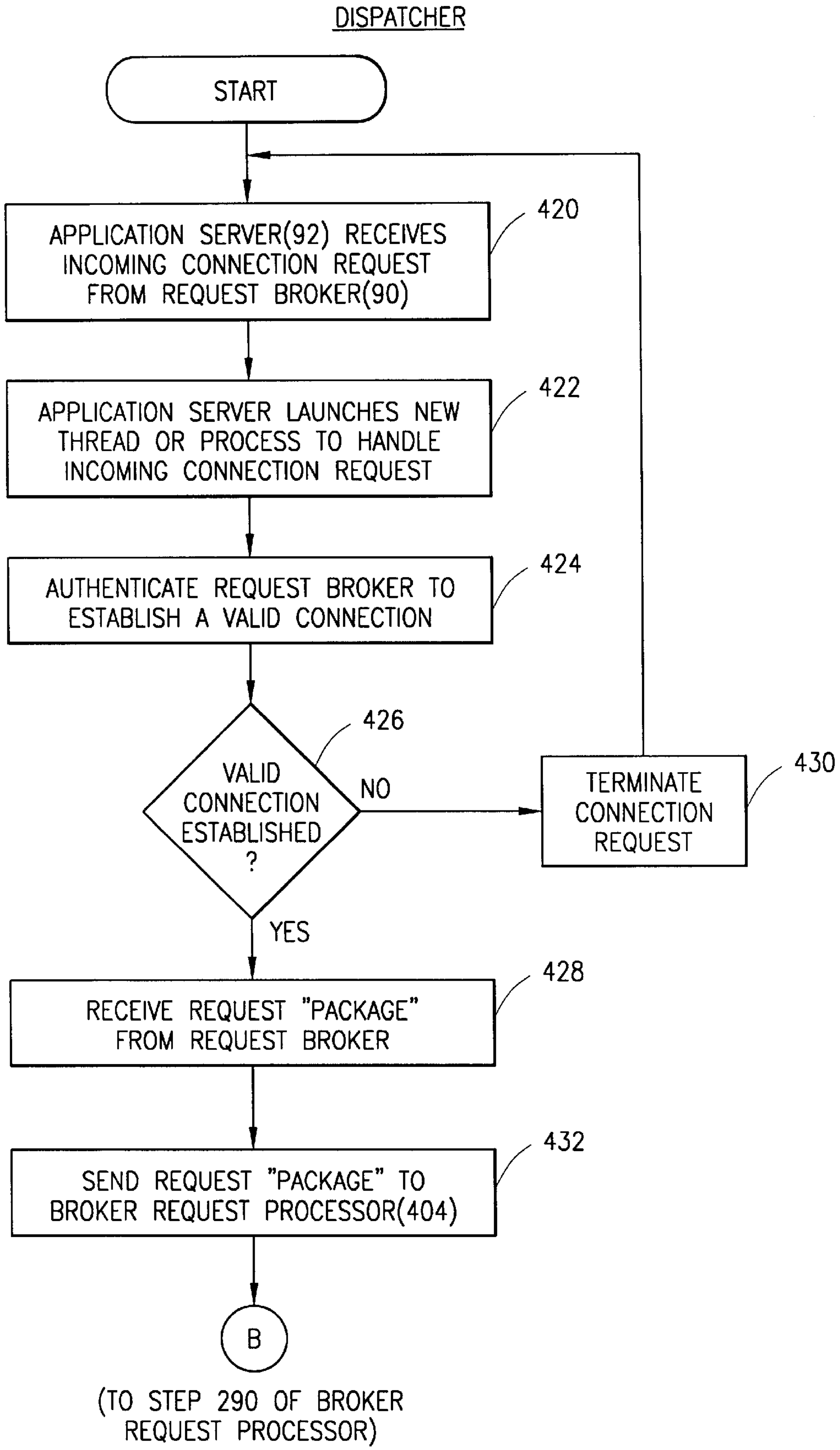
FIG. 15*a* and 15*b* illustrate the function of the Dispatcher of the preferred embodiment.

FIG. 15*a* shows the steps of Dispatcher 400 of the preferred embodiment implemented on a server computer system 72,74 networked to a web server computer system 52 running a Request Broker 90. In step 420, the Dispatcher 400 receives an incoming communication connection (e.g., TCP/IP socket) request from a Request Broker 90 connected to Application Server 92. In step 422, Dispatcher 400 launches a new thread, or launches a new process if it is a Unix-based server computer system 72,74 to handle the incoming connection request from Request Broker 90.

Figure 16A:
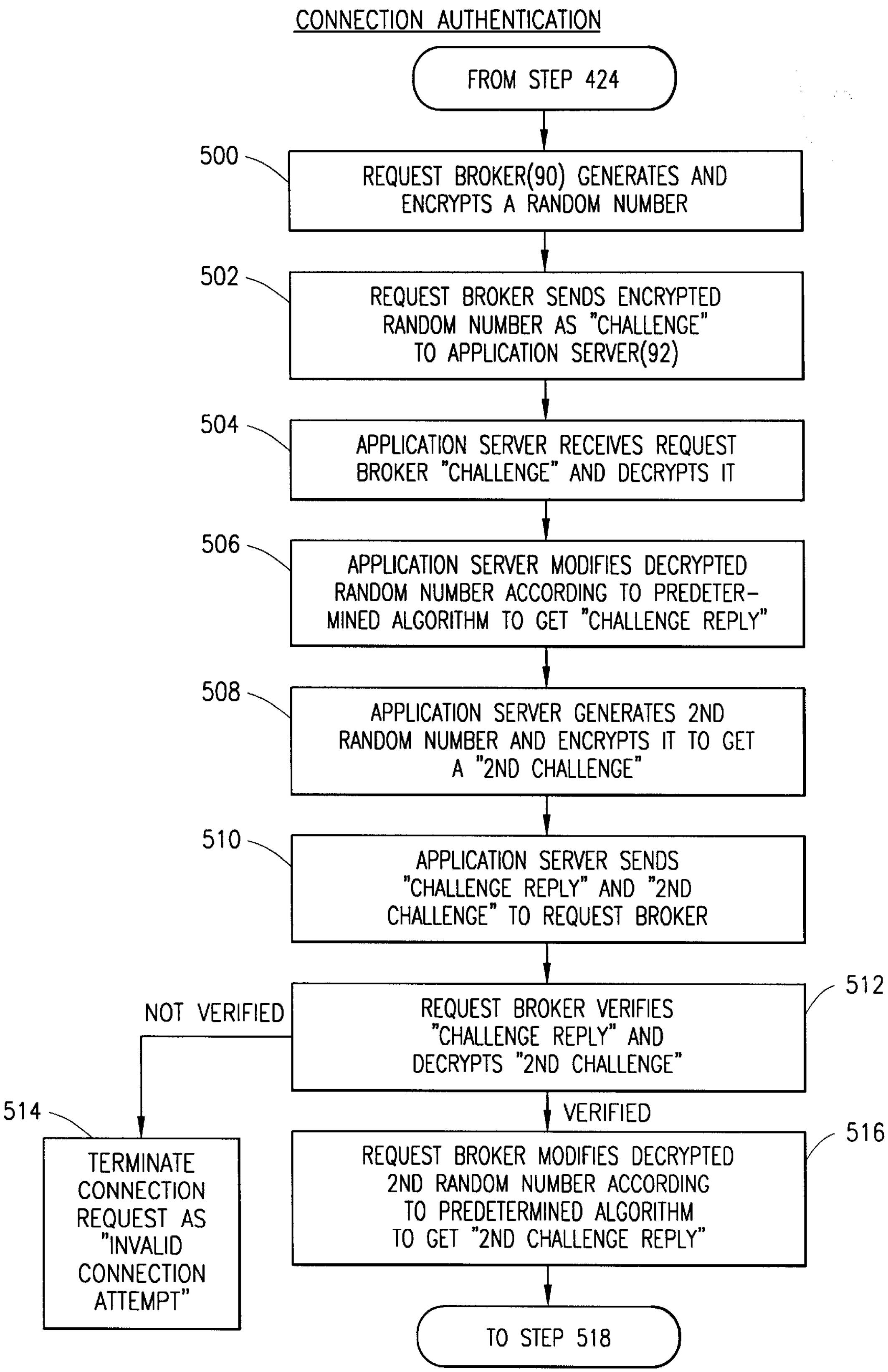
FIG. 16*a* and 16*b* illustrate the connection authentication procedure of the preferred embodiment.
Figure 16B:
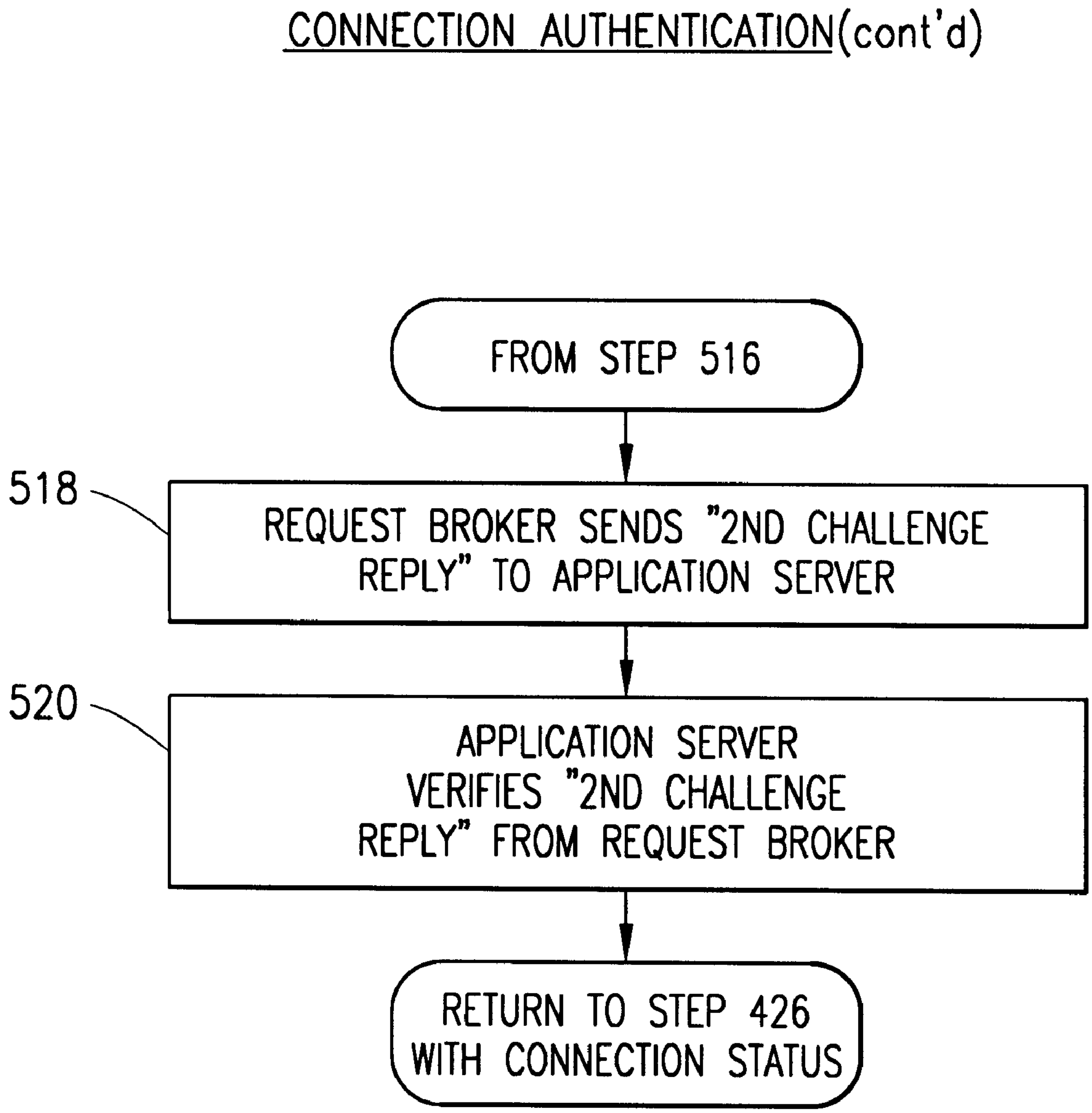

In step 424, a communication connection is established between Application Server 92 and Request Broker 90. Then, the connection is authenticated to establish to both Application Server 92 and Request Broker 90 that the connection is secure and valid. The connection authentication sequence for establishing a secure and valid connection is shown in FIGS. 16*a* and 16*b*. The authentication sequence will be discussed in a later section.

In step 426, if a valid connection between Application Server 92 and Request Broker 90 has not been established, then the connection is terminated in step 430, and Dispatcher 400 goes to step 420 to wait for the next connection request.

If a valid connection is established, then the Network Server Manager 108 of the Request Broker 90 sends the request "package" to the Application Server 92, which receives the request "package" in step 428. In step 432, the request "package" is then sent to Broker Request Processor 404 of Application Server 92 for continued processing.

In the preferred embodiment of the present invention, the steps of Broker Request Processor 404 implemented in Application Server 92 are the same as those for Broker Request Processor 104 implemented in Request Broker 90 described earlier. The only difference is that Broker Request Processor 404 implemented in Application Server 92 will look to the Application Server's configuration file, instead of the Request Broker's configuration file. Accordingly, step 432 transfers the request "package" to Broker Request Processor 404 whose functionality is shown beginning in step 290 in FIG. 10.

Figure 15B:
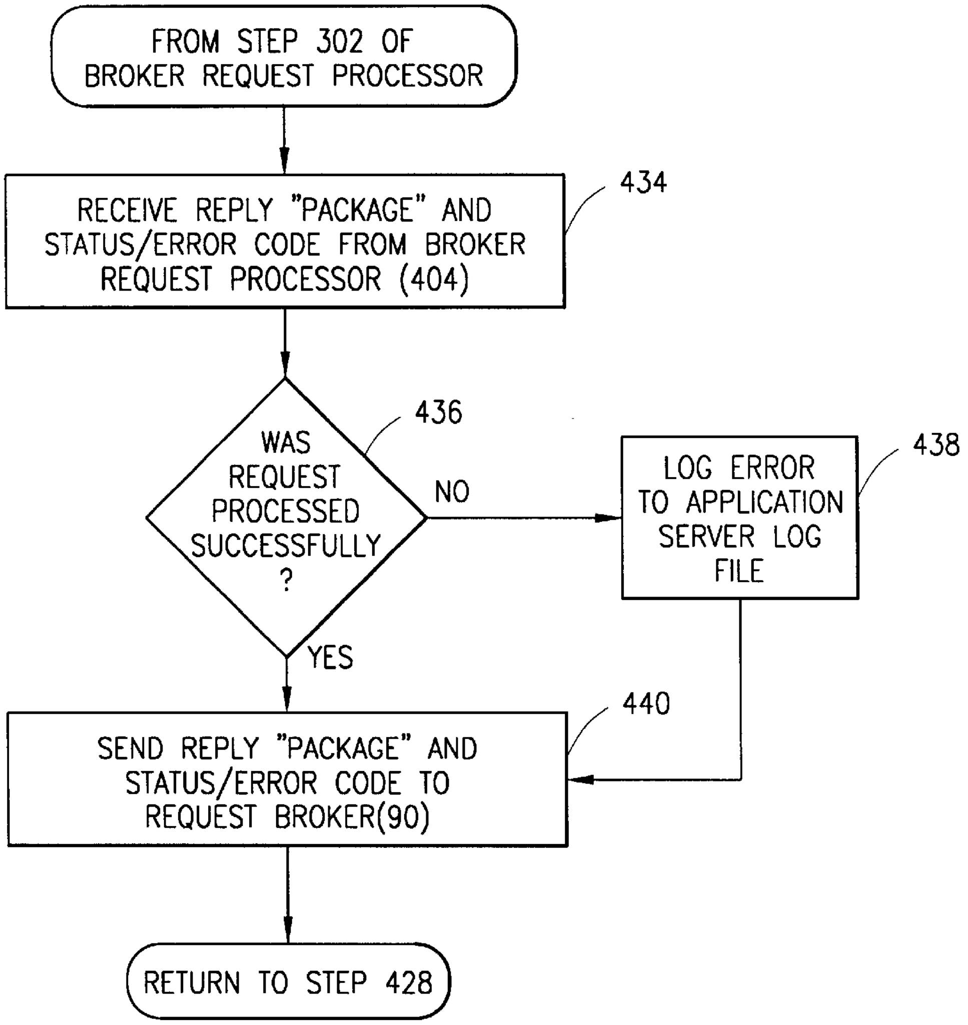

As shown in FIG. 15*b*, in step 434, the request reply "package" and the status/error code was received from Broker Request Processor 404. In step 436, the status/error code is examined to determine whether the request was processed successfully. If the request did not process successfully, then the error code for the request is logged to the Application Server log file (not shown) in step 438, and continues to step 440. If the request was processed successfully, then the request reply content "package" and the status/error code are sent to Request Broker 90 in step 440. Either way, the status/error code is sent to Request Broker 90, and Dispatcher 400 goes back to step 428 to wait for the next request from Request Broker 90.

Similarly, the Content Server Manager 406, the Network Server Manager 408, the Local Content Provider/Filter Module Pool 410, and the Filter Modules 412 operate in the same manner for Application Server 92 as the corresponding components in Request Broker 90. Again, the only difference is that the components implemented on Application Server 92 will look to the configuration file for the particular Application Server 92, instead of the configuration file for Request Broker 90.

By distributing the requests from the web server computer system 52 to the secondary application server computer systems 72,74 in the preferred embodiment, web server computer system 52 becomes less memory constrained and is no longer directly impacted by the execution of requests on the web server computer system. While web server 52 will experience an increase in network I/O, due to communication with the networked Application Servers 92, the increased I/O is typically less stressful or resource intensive on the web server computer system 52 than the execution of the original requests. By off-loading requests from web server computer system 52, the web server computer system can handle more simultaneous connections and handle a larger number of simultaneous web browser clients. This allows the web server program 64 to provide better response to requests from an increasing number of web browser clients.

In addition, the preferred embodiment of the present invention may be configured to manage a fixed number of simultaneous requests, thereby allocating a fixed amount of computer resources for each request processing on a given server computer system. This allows for more efficient management and utilization of a computer systems limited resources.

The preferred embodiment of the present invention is designed so that multiple instances of Application Server 92 may be implemented on a single server computer system 72,74. This allows each Application Server 92 instance to be configured to handle particular types of information requests or handle requests from a particular network communication channel on the server computer system 72,74. For example, one instance of Application Server 92 on a server computer system 72,74 may handle transactions for which the web browser client may be charged a transaction cost. At the same time, another instance of Application Server 92 on the same server computer system 72,74 may handle transactions for which the web browser client is not charged a cost.

The preferred embodiment of the present invention provides the capability of distributing, monitoring, and managing information requests using a scalable, multi-tiered configuration of Request Brokers 90 and Application Servers 92. For example, Application Servers 92 implemented on server computer systems 72,74 (shown in FIG. 4) may also be networked to other server computer systems (not shown) implementing Application Server 92 programs to create a multi-tier network configuration. In this configuration, information requests received by Request Broker 90 implemented on web server computer. system 52 may be distributed to Application Servers 92 implemented on server computer systems 72,74. In turn, the Application Servers 92 implemented on server computer systems 72,74 may also distribute the information requests (received from the Request Broker 90) to other networked Application Servers 92 implemented on other server computer systems in order to distribute the processing of information requests across the computer network. Thus, creating a scalable, multi-tiered environment to distribute, monitor, and manage information requests received by web server computer system 52.

In addition to the automatic fault detection and recovery procedures described above, the preferred embodiment may also be configured to detect request processing failures by inspecting the request reply "package" content to determine whether the reply content consists of a valid output for the particular type of request. This failure detection would also include inspecting the reply content data length and header parameters to determine if they are valid. For example, if the reply content was empty or contained data that was not in a HTML compatible format, then an error would be generated for fault recovery purposes.

Security and Firewall Negotiation

In the preferred embodiment, the communication sessions (e.g., TCP/IP sockets) between the Request Broker 90 and an Application Server 92 are established and validated to ensure a secure connection in step 424 of FIG. 15*a*. The connection authentication sequence between the Request Broker 90 and Application Server 92 for the preferred embodiment is shown in FIGS. 16*a* and 16*b*.

Beginning in step 500, Request Broker 90 generates and encrypts a random number using a predetermined and proprietary encryption methodology. In step 502, Request Broker 90 send the encrypted random number as a "challenge" to Application Server 92. In step 504, Application Server 92 receives the challenge from Request Broker 90 and decrypts the challenge using the predetermined encryption methodology to generate the original random number.

Next, in step 506, Application Server 92 modifies the decrypted random number according to a predetermined algorithm (which may be an encryption algorithm) to generate a "challenge reply." In step 508, Application Server 92 generates a second random number and encrypts it using the predetermined encryption methodology to generate a "second challenge." In step 510, Application Server 92 sends the "challenge reply" and the "second challenge" to Request Broker 90.

In step 512, Request Broker 90 verifies the "challenge reply" by determining whether its original random number was modified in the correct manner according to the predetermined algorithm. If the "challenge reply" is not verified by Request Broker 90, then the authentication sequence terminates in step 514 and an "invalid connection" error denoting a failed authentication is generated by Request Broker 90. If the "challenge reply" is verified, Request Broker 90 then decrypts the "second challenge" to generate the second random number originally produced by Application Server 92. In step 516, Request Broker 90 modifies the decrypted second random number according to a predetermined algorithm to generate a "second challenge reply."

Next, in step 518, Request Broker 90 sends the "second challenge reply" to Application Server 92. In step 520, Application Server 92 verifies the "second challenge reply" by determining if the second random number was modified in the correct manner by Request Broker 90 according to the predetermined algorithm. If the "second challenge reply" is not verified by Application Server 92, then return to step 426 with an "invalid connection" message denoting failed authentication. If the "second challenge reply" is verified by Application Server 92, then return to step 426 with a "valid connection" message.

In this manner, a communication session between a Request Broker 90 and an Application Server 92 may be established so as to ensure that a mutually authenticated secure communications channel is formed. Alternative embodiments of the present invention may utilize other challenge-response methodologies to establish a mutually authenticated communication channel between a Request Broker 90 and an Application Server 92.

Figure 17:
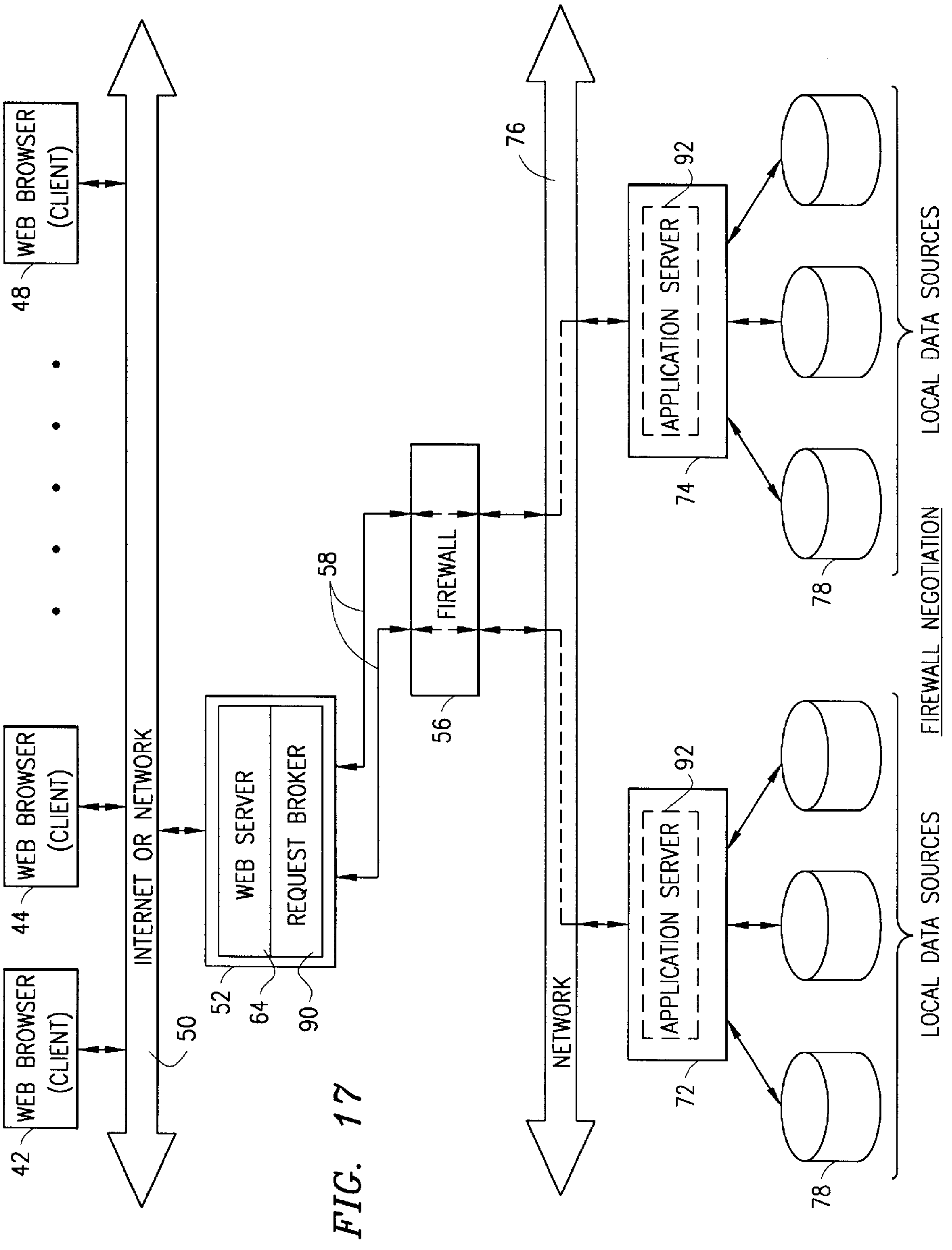
FIG. 17 illustrates the secure firewall negotiation procedure of the preferred embodiment.

The preferred embodiment of the present invention may be configured to facilitate the processing of requests across a network firewall 56. As shown in FIG. 17, a Request Broker 90 may be used to establish secure and/or authenticated communication channels 58 through a network firewall 56 to server computer systems 72,74 implementing Application Servers 92 on the other side of the firewall 56. In this configuration, web browser clients 42, 44, 46, 48 on the outside of firewall 56 may send requests to web server computer system 52 involving access to protected data sources or applications on the other side of firewall 56. Request Broker 90 on the web server computer system 52 establishes a dedicated, mutually-authenticated secure communication channel (e.g., TCP/IP socket) 58 through firewall 56 to Application Servers 92 on the other side of firewall 56. Thus, the present invention provides a technique to efficiently transfer information requests across a network firewall to allow access to protected data sources and applications without having to establish a connection and authenticate each individual request. In this manner, web browsers may be given access to specific protected data sources or applications on a private computer network (or intranet) to create an "extranet." An "extranet" is a computer network in which selected data sources or applications of an intranet computer network are made available to computer systems outside of the intranet, typically over a public computer network such as the Internet.

The preferred embodiment of the present invention is described using a computer network that communicates using the TCP/IP communication protocol for the communications between server computer system 52 implementing a Request Broker 90 and server computer systems 72,74 implementing Application Servers 92. In the preferred embodiment, requests are formatted in a proprietary data "package" format that is used to contain request information (request "package") or request reply content (request reply "package") that is transferred back and forth between Request Broker 90 and the Application Server 92.

Figure 18:
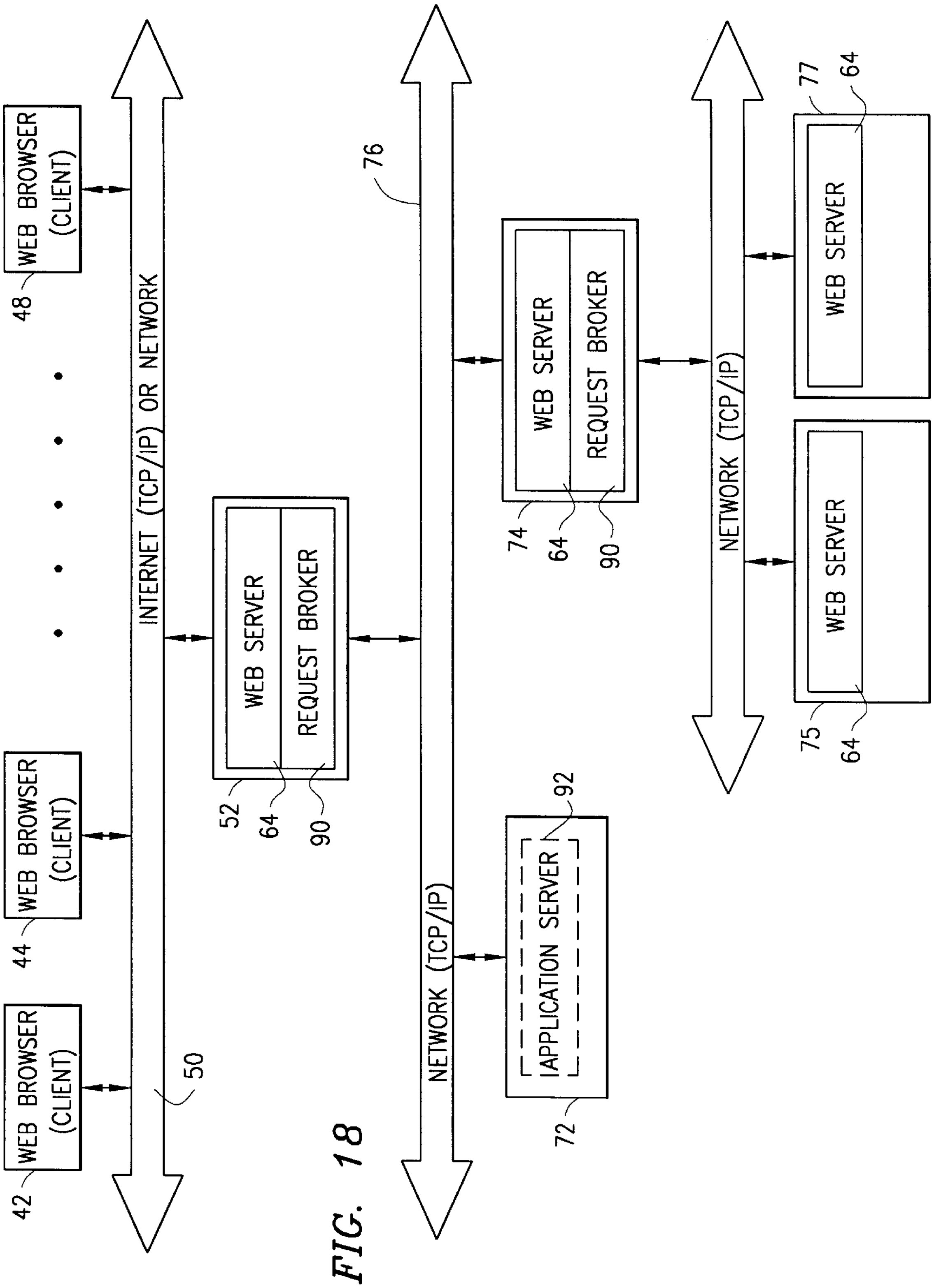
FIG. 18 illustrates an alternate embodiment of the present invention configured in a multi-tier hierarchy.

An alternative embodiment of the present invention is shown in FIG. 18. In network configuration of FIG. 18, in addition to distributing information requests to a networked Application Server 92 implemented in server computer system 72, Request Broker 90 is also configured to transmit requests to and receive replies from server computer system 74 running a conventional web server program 64 using the standard HTTP or SSL information protocols. The SSL or "Secure Sockets Layer" is an information protocol typically used for secure communication channels and is well known to those skilled in the art. In this manner, Request Broker 90 may distribute requests to server computer systems implementing Application Servers 92 or server computer systems implementing conventional web server programs 64.

In the alternative embodiment, Request Broker 90 performs the same functions as described in the preferred embodiment, except that Request Broker 90 is also capable of off-loading requests to server computer systems 74 running conventional web server programs or conventional web server programs 64 with additional software extending its capabilities to enable it to perform the functions of an Application Server 92, such that Request Broker 90 is not restricted to sending requests only to networked Application Servers 92. In addition, if another Request Broker 90 instance is implemented on server computer system 74, then server computer system 74 may be configured to distribute requests to other networked server computer systems 75, 77, thereby creating a scalable, multi-tiered hierarchy of networked server computer systems to distribute the processing of requests across a distributed computing environment.

While the preferred embodiment of the present invention has been described with respect to the distribution, monitoring, and management of CGI requests on the Internet, intranets, and extranets using computer systems with web browsers and web servers, those skilled in the art will readily recognize that the present invention may be implemented on other types of computer networks. The present invention may be implemented on any computer network in which a server computer system handles information or application requests from other computer systems or computer networks.

One of the benefits of the preferred embodiment of the present invention is its "modular extensibility." The modularized implementation of the preferred embodiment using the Adapter and Filter Modules allows the present invention to be easily adapted to interface with different computer interfaces. For example, the Request Broker of the preferred embodiment of the present invention is implemented on a server computer system running a web server, or HTTP server. The Adapter of the Request Broker interfaces with the web server using web server's plug-in API. However, the Adapter may be easily modified or adapted to interface and support other types of server programs, such as but not limited to FTP or "File Transfer Protocol" servers, SMTP or "Simple Mail Transport Protocol" servers, Gopher servers, Corba servers, or IIOP servers, to name a few.

In addition, the Filter Modules of the preferred embodiment allow the present invention to easily adapted to support many different types of "back-end" data sources, applications, or other types of computer system resources. As a result, the present invention may be implemented on a variety of server computer systems without requiring any program code modifications to the underlying web server program or to the "back-end" data sources or applications resident on the server computer system.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A method for managing a plurality of types of information requests, the method comprising the steps of:

receiving an information request from a client computer system, the information request being of a first type of the plurality of types of information requests;

determining an amount of workload associated with a first server computer system and with a second computer system;

selecting one of the first and second server computer systems having the lightest relative workload to process the received information request; and sending the received information request to the selected one of the first and second server computer systems.

2. The method of claim 1, further comprising:

storing configuration information indicating which of the plurality of types of information requests can be processed by the first server computer system and which of the plurality of types of information request that can be processed by the second server computer system; and determining whether the configuration information indicates that the first and second server computer systems are configured to process the type of the received information request, the selecting being based upon the determination.

3. The method of claim 1, wherein:

responsive to a determination that the first workload and the second workload are substantially the same, the step of selecting between the first server computer system and the second server computer system for processing the received information request is based on round-robin scheduling.

4. The method of claim 1, wherein the step of selecting between the first server computer system and the second server computer system for processing the received information request comprises the steps of:

determining the number of pending information requests associated with the first server computer system;

determining the number of pending information requests associated with the second server computer system; and identifying the selected one of the first and second server computer systems as the one having the fewest pending information requests associated therewith.

5. The method of claim 1, wherein the step of selecting includes the steps of:

maintaining a value in a pointer; and incrementing the value maintained in the pointer each time an information request is received, the incremented value indicating the selected one of the first and second server computer systems.

6. An article of manufacture for managing a plurality of types of information requests, the article of manufacture comprising:

a computer readable medium;

a plurality of instructions stored on the computer readable medium, the plurality of instructions configured to cause at least a first processor to perform the steps of:

receiving an information request from a client computer system, the information request being of a first type of the plurality of types of information requests;

determining an amount of workload associated with a first server computer system and with a second computer system;

selecting one of the first and second server computer systems having the lightest relative workload to process the received information request; and sending the received information request to the selected one of the first and second server computer systems.

7. The article of manufacture of claim 6, further comprising instructions stored on the computer readable medium configured to cause the at least one processor to perform the steps of:

storing configuration information indicating which of the plurality of types of information requests can be processed by the first server computer system and which of the plurality of types of information request that can be processed by the second server computer system; and determining whether the configuration information indicates that the first and second server computer systems are configured to process the type of the received information request, the selecting being based upon the determination.

8. The article of manufacture according to claim 6, wherein the instructions for selecting between the first server computer system and the second server computer system for processing the received information request is based on round-robin scheduling, in the event that the first workload and the second workload are determined to be substantially the same.

9. The article of manufacture according to claim 6, wherein the ins tructions associated with selecting between the first server computer system and the second server computer system for processing the received information request comprises instructions for:

determining the number of pending information requests associated with the first server computer system;

determining the number of pending information requests associated with the second server computer system; and identifying the selected one of the first and second server computer systems as the one having the fewest pending information requests associated therewith.

10. The article of manufacture according to claim 6, wherein the instructions for selecting include instructions to cause the at least one processor to perform the steps of:

maintaining a value in a pointer; and changing the value maintained in the pointer each time an information request is received, the changed value indicating the selected one of the first and second server computer systems.

11. A system for processing information requests, comprising:

a first server computer system capable of receiving an information request; and a plurality of second server computer systems, each second server computer system being in communication with the first server computer system, the first server computer system being capable of selecting one of the second server computer systems to process the received information request so as substantially balance the processing of information requests among the second server computer systems.

12. The system of claim 11, further comprising:

a plurality of third server computer systems, each third server computer system being in communication with the second server computer system, the second server computer system being capable of selecting one of the third server computer systems to process the received information request so as to substantially balance the processing of information requests among the third server computer systems.

13. The system of claim 12, wherein the second server computer system selects the selected one of the third server computer systems based upon the amount of pending information requests to be processed by each third server computer system.

14. The system of claim 11, wherein the first server computer system selects the selected one of the second server computer systems based upon the amount of pending information requests to be processed by each second server computer system.

15. The system of claim 11, wherein the first server computer system transports the received information request to the selected one of the second server computer systems for processing the received information request, and monitors the received information request to confirm that the received information request was successfully processed.

16. The system of claim 11, wherein the first server computer system selects one of the second server computer systems in the event the first server computer system is not enabled for processing the received information request.

17. The system of claim 11, wherein:

the first server computer system determines the type of the received information request and processes the received information request in the event that the second server computer systems are not configured to process the determined type of the received information requests.

18. The system of claim 11, wherein the first server computer system maintains at least one configuration file having information corresponding to parameters under which the second server computer systems process information requests, and accesses the at least one configuration file in selecting the second server computer system to process the received information request.

19. The system of claim 18, wherein the configuration file includes information corresponding to parameters under which the first server computer system processes information requests, and the first server computer system accesses the at least one configuration file in determining whether to select one of the second server computer systems to process the received information request.

20. The system of claim 11, wherein the first server computer system includes an index pointer, a value of the index pointer indicating the second server computer system to be selected to process the received information request.

21. The system of claim 20, wherein the index pointer is incremented each time the first server computer system selects a second server computer system to process an information request.

* * * * *

UNITED STATES PATENT AND TRADEMARK OFFICE

CERTIFICATE OF CORRECTION

PATENT NO. : 6,304,967 B1
DATED : October 16, 2001
INVENTOR(S) : Ricky Gene Braddy It is certified that error appears in the above-identified patent and that said Letters Patent is hereby corrected as shown below:

Title page,
Item [73], replace "RMC" with -- BMC --.

Column 1,
Line 38, replace "intemets" with -- internets --.
Line 47, replace "intemet" wih -- internet --.
Line 60, replace "conmunication" with -- communication --.
Line 61, replace "servers" with -- server --.

Column 3,
Line 32, replace "serve" with -- server --.
Line 47, replace "win" with -- will --.
Line 55, replace "HTL" with -- HTML --.
Line 58, replace "irefers" with -- refers --.
Line 61, replace "HTEL" with -- HTML --.

Column 4,
Line 4, replace "Conmmon" with -- Common --.

Column 5,
Line 21, replace "intemets" with -- internets --.

Column 6,
Line 17, replace "INVNTION" with -- INVENTION --.

Column 7,
Line 49, replace "finction" with -- function --.

Column 8,
Line 14, replace "diagrn" with -- diagram --.

UNITED STATES PATENT AND TRADEMARK OFFICE
CERTIFICATE OF CORRECTION

PATENT NO. : 6,304,967 B1
DATED : October 16, 2001
INVENTOR(S) : Ricky Gene Braddy It is certified that error appears in the above-identified patent and that said Letters Patent is hereby corrected as shown below:

Column 10,
Line 2, replace "LocalFaliback" with -- LocalFallback --.
Line 50, replace "win" with -- will --.
Line 55, replace "cgitest-exe" with -- cgitest.exe --.
Line 67, replace "internall" with -- internal --.

Column 11,
Line 1, replace "bmctww" with -- bmc/ww --.
Line 20, replace "commnunicating" with -- communicating --.
Line 35, replace "configuiration" with -- configuration --.
Line 53, replace "deterrmine" with -- determine --.
Line 57, replace "vita" with -- virtual --.
Line 58, replace "usefuil" with -- useful --.

Column 13,
Line 1, replace "URIL" with -- URL --.
Line 25, replace "inconing" with -- incoming --.
Line 28, replace "afterthe" with -- after the --.
Line 56, replace "HTFP" with -- HTTP --.

Column 15,
Line 24, replace "statuslerror" with -- status/error --.
Line 53, replace "htm l" with -- html --.
Line 66, replace "symbolieed" with -- symbolized --.

Column 16,
Line 14, replace "Manage" with -- Manager --.

UNITED STATES PATENT AND TRADEMARK OFFICE

CERTIFICATE OF CORRECTION

PATENT NO. : 6,304,967 B1
DATED : October 16, 2001
INVENTOR(S) : Ricky Gene Braddy It is certified that error appears in the above-identified patent and that said Letters Patent is hereby corrected as shown below:

Column 17,
Line 3, replace "serve" with -- server --.

Column 18,
Line 6, replace "dateltime" with -- date/time --.

Column 19,
Line 59, replace "failback" with -- fallback --.

Column 20,
Line 33, replace "sysem" with -- system --.

Column 21,
Line 60, replace "Net work" with -- Network --.

Column 22,
Line 4, replace "statuslerror" with -- status/error --.

Column 28,
Line 42, replace "ins tructions" with -- instructions --.

Signed and Sealed this

Twenty-sixth Day of March, 2002

*Attest:*

JAMES E. ROGAN

*Attesting Officer*

*Director of the United States Patent and Trademark Office*